United States Patent
Zywicki et al.

(10) Patent No.: US 10,635,119 B2
(45) Date of Patent: *Apr. 28, 2020

(54) METHOD AND SYSTEM FOR CONFIGURING WIRELESS SENSORS IN AN HVAC SYSTEM

(71) Applicant: Ademco Inc., Golden Valley, MN (US)

(72) Inventors: Stan Zywicki, Eden Prairie, MN (US); Cary Leen, Hammond, WI (US); Barbara Dean-Hendricks, Woodbury, MN (US); Steve C. Nichols, Maple Grove, MN (US); Jeffrey Holmquist, Minneapolis, MN (US); Jan Tesitel, Brno (CZ); David Schultz, Savage, MN (US); Jaromir Cechak, Brno (CZ); Patrick Tessier, Maple Grove, MN (US)

(73) Assignee: Ademco Inc., Golden Valley, MN (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/951,392

(22) Filed: Apr. 12, 2018

(65) Prior Publication Data

US 2018/0231995 A1 Aug. 16, 2018

Related U.S. Application Data

(63) Continuation of application No. 15/340,756, filed on Nov. 1, 2016, now Pat. No. 9,971,364, which is a (Continued)

(51) Int. Cl.
*G06F 19/00* (2018.01)
*G05D 23/19* (2006.01)
(Continued)

(52) U.S. Cl.
CPC .......... *G05D 23/1905* (2013.01); *F24F 11/30* (2018.01); *F24F 11/52* (2018.01);
(Continued)

(58) Field of Classification Search
CPC .. F24F 11/30; F24F 11/52; F24F 11/56; F24F 11/62; F24F 11/65; F24F 2110/00;
(Continued)

(56) References Cited

U.S. PATENT DOCUMENTS 4,079,366 A 3/1978 Wong
4,174,807 A 11/1979 Smith et al.
(Continued)

FOREIGN PATENT DOCUMENTS

DE 3334117 A1 4/1985
EP 0070414 A1 1/1983
(Continued)

OTHER PUBLICATIONS

White-Rodgers, "1F80-224 Programmable Electronic Digital Thermostat, Installation and Operation Instructions," 8 pages, prior to Apr. 21, 2005.
(Continued)

*Primary Examiner* — Kidest Bahta
(74) *Attorney, Agent, or Firm* — Shumaker & Sieffert, P.A.

(57) ABSTRACT

An HVAC controller for controlling an HVAC system may be configured to enroll one or more wireless devices, and once one or more wireless devices are enrolled, to prompt the user to enter an identifier, a location, a device type and/or a function for one or more of the enrolled wireless devices. The HVAC controller may use the identifier, location and/or device type to identify each of the enrolled devices. This may facilitate a user in selecting various sensors to participate in sensor averaging, identifying where certain sensor
(Continued)

data is originating, identifying devices having a low battery condition, as well as performing other tasks as desired.

20 Claims, 23 Drawing Sheets

Related U.S. Application Data continuation of application No. 13/434,778, filed on Mar. 29, 2012, now Pat. No. 9,488,994.

(51) Int. Cl.
  *F24F 11/30* (2018.01)
  *F24F 11/62* (2018.01)
  *F24F 11/65* (2018.01)
  *F24F 11/56* (2018.01)
  *F24F 11/52* (2018.01)
  *G05B 19/042* (2006.01)
  *G05B 19/048* (2006.01)
  *F24F 110/00* (2018.01)
  *F24F 110/10* (2018.01)
  *F24F 110/20* (2018.01)
  *F24F 110/50* (2018.01)

(52) U.S. Cl.
  CPC .............. *F24F 11/56* (2018.01); *F24F 11/62* (2018.01); *F24F 11/65* (2018.01); *G05B 19/048* (2013.01); *G05B 19/0423* (2013.01); *F24F 2110/00* (2018.01); *F24F 2110/10* (2018.01); *F24F 2110/20* (2018.01); *F24F 2110/50* (2018.01); *G05B 2219/2614* (2013.01)

(58) Field of Classification Search
  CPC .............. F24F 2110/10; F24F 2110/20; F24F 2110/50; G05B 19/0423; G05B 19/048; G05B 2219/2614
  See application file for complete search history.

(56) References Cited

U.S. PATENT DOCUMENTS

| | | |
|---|---|---|
| 4,206,872 A | 6/1980 | Levine |
| 4,224,615 A | 9/1980 | Penz |
| 4,264,034 A | 4/1981 | Hyltin et al. |
| 4,296,334 A | 10/1981 | Wong |
| 4,298,946 A | 11/1981 | Hartsell et al. |
| 4,308,991 A | 1/1982 | Peinetti et al. |
| 4,316,256 A | 2/1982 | Hendricks et al. |
| 4,332,352 A | 6/1982 | Jaeger |
| 4,337,822 A | 7/1982 | Hyltin et al. |
| 4,337,893 A | 7/1982 | Flanders et al. |
| 4,373,664 A | 2/1983 | Barker et al. |
| 4,379,483 A | 4/1983 | Farley |
| 4,382,544 A | 5/1983 | Stewart |
| 4,386,649 A | 6/1983 | Hines et al. |
| 4,388,692 A | 6/1983 | Jones et al. |
| 4,431,134 A | 2/1984 | Hendricks et al. |
| 4,442,972 A | 4/1984 | Sahay et al. |
| 4,446,913 A | 5/1984 | Krocker |
| 4,479,604 A | 10/1984 | Didner |
| 4,503,471 A | 3/1985 | Hanajima et al. |
| 4,506,827 A | 3/1985 | Jamieson et al. |
| 4,556,169 A | 12/1985 | Zervos |
| 4,585,164 A | 4/1986 | Butkovich et al. |
| 4,598,355 A | 7/1986 | Shepler et al. |
| 4,606,401 A | 8/1986 | Levine et al. |
| 4,621,336 A | 11/1986 | Brown |
| 4,622,544 A | 11/1986 | Bially et al. |
| 4,628,201 A | 12/1986 | Schmitt |
| 4,646,964 A | 3/1987 | Parker et al. |
| 4,717,333 A | 1/1988 | Carignan |
| 4,725,001 A | 2/1988 | Carney et al. |
| 4,837,731 A | 6/1989 | Levine et al. |
| 4,881,686 A | 11/1989 | Mehta |
| 4,918,439 A | 4/1990 | Wozniak et al. |
| 4,942,613 A | 7/1990 | Lynch |
| 4,948,040 A | 8/1990 | Kobayashi et al. |
| 4,969,508 A | 11/1990 | Tate et al. |
| 4,992,779 A | 2/1991 | Sugino et al. |
| 4,997,029 A | 3/1991 | Otsuka et al. |
| 5,005,365 A | 4/1991 | Lynch |
| 5,012,973 A | 5/1991 | Pearce et al. |
| 5,036,698 A | 8/1991 | Conti |
| 5,038,851 A | 8/1991 | Mehta |
| 5,053,752 A | 10/1991 | Epstein et al. |
| 5,065,813 A | 11/1991 | Berkeley et al. |
| 5,086,385 A | 2/1992 | Launey et al. |
| 5,088,645 A | 2/1992 | Bell |
| 5,140,310 A | 8/1992 | Deluca et al. |
| 5,161,606 A | 11/1992 | Berkeley et al. |
| 5,170,935 A | 12/1992 | Federspeil et al. |
| 5,172,565 A | 12/1992 | Wruck et al. |
| 5,181,653 A | 1/1993 | Foster et al. |
| 5,187,797 A | 2/1993 | Nielsen et al. |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,272,477 A | 12/1993 | Tashima et al. |
| 5,329,991 A | 7/1994 | Mehta et al. |
| 5,348,078 A | 9/1994 | Dushane et al. |
| 5,351,035 A | 9/1994 | Chrisco |
| 5,369,597 A | 11/1994 | Bujak, Jr. |
| 5,386,577 A | 1/1995 | Zenda |
| 5,390,206 A | 2/1995 | Rein et al. |
| 5,404,934 A | 4/1995 | Carlson et al. |
| 5,414,618 A | 5/1995 | Mock et al. |
| 5,429,649 A | 7/1995 | Robin |
| 5,482,209 A | 1/1996 | Cochran et al. |
| 5,495,887 A | 3/1996 | Kathnelson et al. |
| 5,506,572 A | 4/1996 | Hills et al. |
| 5,526,422 A | 6/1996 | Keen |
| 5,537,106 A | 7/1996 | Mitsuhashi |
| 5,544,036 A | 8/1996 | Brown et al. |
| 5,566,879 A | 10/1996 | Longtin |
| 5,570,837 A | 11/1996 | Brown et al. |
| 5,590,831 A | 1/1997 | Manson et al. |
| 5,603,451 A | 2/1997 | Helander et al. |
| 5,654,813 A | 8/1997 | Whitworth |
| 5,668,535 A | 9/1997 | Hendrix et al. |
| 5,671,083 A | 9/1997 | Conner et al. |
| 5,673,850 A | 10/1997 | Uptegraph |
| 5,679,137 A | 10/1997 | Erdman et al. |
| 5,682,206 A | 10/1997 | Wehmeyer et al. |
| 5,711,785 A | 1/1998 | Maxwell |
| 5,732,691 A | 3/1998 | Maiello et al. |
| 5,761,083 A | 6/1998 | Brown et al. |
| 5,782,296 A | 7/1998 | Mehta |
| 5,810,908 A | 9/1998 | Gray et al. |
| 5,818,428 A | 10/1998 | Eisenbrandt et al. |
| 5,831,134 A | 11/1998 | Gnann et al. |
| 5,833,134 A | 11/1998 | Ho et al. |
| 5,839,654 A | 11/1998 | Weber |
| 5,840,094 A | 11/1998 | Osendorf et al. |
| 5,862,737 A | 1/1999 | Chiu et al. |
| 5,873,519 A | 2/1999 | Beilfuss |
| 5,886,697 A | 3/1999 | Naughton et al. |
| 5,892,690 A * | 4/1999 | Boatman .............. G05B 19/042 340/870.02 |
| 5,901,183 A | 5/1999 | Garin et al. |
| 5,902,183 A | 5/1999 | D'Souza |
| 5,909,429 A | 6/1999 | Satyanarayana et al. |
| 5,915,473 A | 6/1999 | Ganesh et al. |
| 5,917,141 A | 6/1999 | Naquin, Jr. |
| 5,917,416 A | 6/1999 | Read |
| D413,328 S | 8/1999 | Kazama |
| 5,937,942 A | 8/1999 | Bias et al. |
| 5,947,372 A | 9/1999 | Tiernan |
| 5,950,709 A | 9/1999 | Krueger et al. |
| 6,009,355 A | 12/1999 | Obradovich et al. |
| 6,013,121 A | 1/2000 | Chiu et al. |

(56) References Cited

U.S. PATENT DOCUMENTS

| | | |
|---|---|---|
| 6,020,881 A | 2/2000 | Naughton et al. |
| 6,032,867 A | 3/2000 | Dushane et al. |
| D422,594 S | 4/2000 | Henderson et al. |
| 6,059,195 A | 5/2000 | Adams et al. |
| 6,081,197 A | 6/2000 | Garrick et al. |
| 6,084,523 A | 7/2000 | Gelnovatch et al. |
| 6,101,824 A | 8/2000 | Meyer et al. |
| 6,104,963 A | 8/2000 | Cebasek et al. |
| 6,119,125 A | 9/2000 | Gloudeman et al. |
| 6,121,875 A | 9/2000 | Hamm et al. |
| 6,140,987 A | 10/2000 | Stein et al. |
| 6,141,595 A | 10/2000 | Gloudeman et al. |
| 6,145,751 A | 11/2000 | Ahmed |
| 6,149,065 A | 11/2000 | White et al. |
| 6,152,375 A | 11/2000 | Robison |
| 6,154,681 A | 11/2000 | Drees et al. |
| 6,167,316 A | 12/2000 | Gloudeman et al. |
| 6,190,442 B1 | 2/2001 | Redner |
| 6,192,282 B1 | 2/2001 | Smith et al. |
| 6,196,467 B1 | 3/2001 | Dushane et al. |
| 6,208,331 B1 | 3/2001 | Singh et al. |
| 6,215,405 B1 | 4/2001 | Handley et al. |
| 6,216,956 B1 | 4/2001 | Ehlers et al. |
| 6,236,326 B1 | 5/2001 | Murphy |
| 6,259,074 B1 | 7/2001 | Brunner et al. |
| 6,260,765 B1 | 7/2001 | Natale et al. |
| 6,285,912 B1 | 9/2001 | Ellison et al. |
| 6,290,140 B1 | 9/2001 | Pesko et al. |
| D448,757 S | 10/2001 | Okubo |
| 6,315,211 B1 | 11/2001 | Sartain et al. |
| 6,318,639 B1 | 11/2001 | Toth |
| 6,321,637 B1 | 11/2001 | Shanks et al. |
| 6,330,806 B1 | 12/2001 | Beaverson et al. |
| 6,344,861 B1 | 2/2002 | Naughton et al. |
| 6,351,693 B1 | 2/2002 | Monie et al. |
| 6,385,510 B1 | 5/2002 | Hoog et al. |
| 6,394,359 B1 | 5/2002 | Morgan |
| 6,398,118 B1 | 6/2002 | Rosen et al. |
| 6,448,896 B1 | 9/2002 | Bankus et al. |
| 6,449,533 B1 | 9/2002 | Mueller et al. |
| 6,449,726 B1 | 9/2002 | Smith |
| 6,453,687 B2 | 9/2002 | Sharood et al. |
| D464,948 S | 10/2002 | Vasquez et al. |
| 6,460,774 B2 | 10/2002 | Sumida et al. |
| 6,466,132 B1 | 10/2002 | Caronna et al. |
| 6,478,233 B1 | 11/2002 | Shah |
| 6,502,758 B2 | 1/2003 | Cottrell |
| 6,507,282 B1 | 1/2003 | Sherwood |
| 6,518,953 B1 | 2/2003 | Armstrong |
| 6,518,957 B1 | 2/2003 | Lehtinen et al. |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,578,770 B1 | 6/2003 | Rosen |
| 6,580,950 B1 | 6/2003 | Johnson et al. |
| 6,581,846 B1 | 6/2003 | Rosen |
| 6,595,430 B1 | 7/2003 | Shah |
| 6,596,059 B1 | 7/2003 | Greist et al. |
| D478,051 S | 8/2003 | Sagawa |
| 6,608,560 B2 | 8/2003 | Abrams |
| 6,619,555 B2 | 9/2003 | Rosen |
| 6,621,507 B1 | 9/2003 | Shah |
| 6,624,750 B1 | 9/2003 | Marman et al. |
| 6,663,010 B2 | 12/2003 | Chene et al. |
| 6,685,098 B2 | 2/2004 | Okano et al. |
| 6,726,112 B1 | 4/2004 | Ho |
| D492,282 S | 6/2004 | Lachello et al. |
| 6,783,079 B2 | 8/2004 | Carey et al. |
| 6,786,421 B2 | 9/2004 | Rosen |
| 6,789,739 B2 | 9/2004 | Rosen |
| 6,801,849 B2 | 10/2004 | Szukala et al. |
| 6,810,307 B1 | 10/2004 | Addy |
| 6,810,397 B1 | 10/2004 | Qian et al. |
| 6,824,069 B2 | 11/2004 | Rosen |
| 6,833,990 B2 | 12/2004 | LaCroix et al. |
| 6,842,721 B2 | 1/2005 | Kim et al. |
| 6,850,252 B1 | 2/2005 | Hoffberg |
| 6,851,621 B1 | 2/2005 | Wacker et al. |
| 6,868,293 B1 | 3/2005 | Schurr et al. |
| 6,934,862 B2 | 8/2005 | Sharood et al. |
| D512,208 S | 12/2005 | Kubo et al. |
| 6,973,410 B2 | 12/2005 | Seigel |
| 7,001,495 B2 | 2/2006 | Essalik et al. |
| D520,989 S | 5/2006 | Miller |
| 7,050,026 B1 | 5/2006 | Rosen |
| 7,055,759 B2 | 6/2006 | Wacker et al. |
| 7,058,477 B1 | 6/2006 | Rosen |
| 7,080,358 B2 | 7/2006 | Kuzmin |
| 7,083,109 B2 | 8/2006 | Pouchak |
| 7,083,189 B2 | 8/2006 | Ogata |
| 7,084,774 B2 | 8/2006 | Martinez |
| 7,089,088 B2 | 8/2006 | Terry et al. |
| 7,108,194 B1 | 9/2006 | Hankins, II |
| 7,130,719 B2 | 10/2006 | Ehlers et al. |
| 7,130,720 B2 | 10/2006 | Fisher |
| D531,588 S | 11/2006 | Peh |
| D533,515 S | 12/2006 | Klein et al. |
| 7,146,253 B2 | 12/2006 | Hoog et al. |
| 7,152,806 B1 | 12/2006 | Rosen |
| 7,156,318 B1 | 1/2007 | Rosen |
| 7,163,156 B2 | 1/2007 | Kates |
| 7,188,002 B2 | 3/2007 | Chapman, Jr. et al. |
| D542,236 S | 5/2007 | Klein et al. |
| 7,212,887 B2 | 5/2007 | Shah et al. |
| 7,222,800 B2 | 5/2007 | Wruck |
| 7,225,054 B2 | 5/2007 | Amundson et al. |
| 7,231,605 B1 | 6/2007 | Ramakesavan |
| 7,232,075 B1 | 6/2007 | Rosen |
| 7,240,289 B2 | 7/2007 | Naughton et al. |
| 7,244,294 B2 | 7/2007 | Kates |
| 7,261,762 B2 | 8/2007 | Kang et al. |
| 7,274,973 B2 | 9/2007 | Nichols et al. |
| 7,302,642 B2 | 11/2007 | Smith et al. |
| 7,331,187 B2 | 2/2008 | Kates |
| 7,340,769 B2 | 3/2008 | Baugher |
| 7,341,201 B2 | 3/2008 | Stanimirovic |
| 7,354,005 B2 | 4/2008 | Carey et al. |
| RE40,437 E | 7/2008 | Rosen |
| 7,419,532 B2 | 9/2008 | Sellers et al. |
| 7,435,278 B2 | 10/2008 | Terlson |
| 7,451,606 B2 | 11/2008 | Harrod |
| 7,452,396 B2 | 11/2008 | Terlson et al. |
| 7,496,627 B2 | 2/2009 | Moorer et al. |
| 7,505,914 B2 | 3/2009 | McCall |
| 7,542,867 B2 | 6/2009 | Steger et al. |
| 7,556,207 B2 | 7/2009 | Mueller et al. |
| 7,565,813 B2 | 7/2009 | Pouchak |
| 7,584,897 B2 | 9/2009 | Schultz et al. |
| 7,594,960 B2 | 9/2009 | Johansson |
| 7,604,046 B2 | 10/2009 | Bergman et al. |
| 7,617,691 B2 | 11/2009 | Street et al. |
| 7,644,591 B2 | 1/2010 | Singh et al. |
| 7,665,019 B2 | 2/2010 | Jaeger |
| 7,676,282 B2 | 3/2010 | Bosley |
| 7,707,189 B2 | 4/2010 | Haselden et al. |
| 7,713,339 B2 | 5/2010 | Johansson |
| 7,739,282 B1 | 6/2010 | Smith et al. |
| 7,768,420 B2 | 8/2010 | Meogi et al. |
| 7,770,242 B2 | 8/2010 | Sell |
| 7,789,317 B2 | 9/2010 | Votaw et al. |
| 7,793,056 B2 | 9/2010 | Boggs et al. |
| 7,814,516 B2 | 10/2010 | Stecyk et al. |
| 7,865,252 B2 | 1/2011 | Clayton |
| 7,900,849 B2 | 3/2011 | Barton et al. |
| 7,908,643 B2 | 3/2011 | Huotari et al. |
| 7,941,431 B2 | 5/2011 | Bluhm et al. |
| 7,952,485 B2 | 5/2011 | Schechter et al. |
| 7,957,775 B2 | 6/2011 | Allen, Jr. et al. |
| 7,984,220 B2 | 7/2011 | Gerard et al. |
| 8,032,254 B2 | 10/2011 | Amundson et al. |
| 8,060,470 B2 | 11/2011 | Davidson et al. |
| 8,087,593 B2 | 1/2012 | Leen |
| 8,091,796 B2 | 1/2012 | Amundson et al. |
| 8,146,831 B2 | 4/2012 | Seemller |

(56) References Cited

U.S. PATENT DOCUMENTS

| | | |
|---|---|---|
| 8,167,216 B2 | 5/2012 | Schultz et al. |
| 8,180,492 B2 | 5/2012 | Steinberg |
| 8,224,491 B2 | 7/2012 | Koster et al. |
| 8,239,066 B2 | 8/2012 | Jennings et al. |
| 8,276,829 B2 | 10/2012 | Stoner et al. |
| 8,280,556 B2 | 10/2012 | Besore et al. |
| 8,304,699 B2 | 11/2012 | Fliess et al. |
| 8,346,396 B2 | 1/2013 | Amundson et al. |
| 8,373,553 B2 | 2/2013 | Bell |
| 8,532,190 B2 | 9/2013 | Shimizu et al. |
| 8,554,374 B2 | 10/2013 | Lunacek et al. |
| 8,571,518 B2 | 10/2013 | Imes et al. |
| 8,574,343 B2 | 11/2013 | Bisson et al. |
| 8,606,554 B2 | 12/2013 | Zimmermann et al. |
| 8,613,792 B2 | 12/2013 | Ragland et al. |
| 8,623,117 B2 | 1/2014 | Zavodny et al. |
| 8,639,990 B2 | 1/2014 | Yasukawa |
| 8,657,936 B2 | 2/2014 | Sullivan |
| 8,659,398 B2 | 2/2014 | Bell |
| 8,661,515 B2 | 2/2014 | Meylemans et al. |
| 8,677,342 B1 | 3/2014 | Kidder et al. |
| 8,704,672 B2 | 4/2014 | Hoglund et al. |
| 8,731,723 B2 | 5/2014 | Boll et al. |
| 8,734,565 B2 | 5/2014 | Hoglund et al. |
| 8,881,172 B2 | 11/2014 | Schneider |
| 8,886,179 B2 | 11/2014 | Pathuri et al. |
| 8,892,223 B2 | 11/2014 | Leen et al. |
| 8,902,071 B2 | 12/2014 | Barton et al. |
| 9,002,523 B2 | 4/2015 | Erickson et al. |
| 9,007,168 B2 | 4/2015 | Bos et al. |
| 9,080,784 B2 | 7/2015 | Dean-Hendricks et al. |
| 9,143,402 B2 | 9/2015 | Tinnakornsrisuphap et al. |
| 9,151,510 B2 | 10/2015 | Leen |
| 9,157,647 B2 | 10/2015 | Leen et al. |
| 9,206,993 B2 | 12/2015 | Barton et al. |
| 9,366,448 B2 | 6/2016 | Dean-Hendricks et al. |
| 9,374,268 B2 | 6/2016 | Budde et al. |
| 9,442,500 B2 | 9/2016 | Nichols et al. |
| 9,488,994 B2 | 11/2016 | Zywicki et al. |
| 2001/0025349 A1 | 9/2001 | Sharood et al. |
| 2001/0029585 A1 | 10/2001 | Simon et al. |
| 2001/0042684 A1 | 11/2001 | Essalik et al. |
| 2001/0052459 A1 | 12/2001 | Essalik et al. |
| 2002/0005435 A1 | 1/2002 | Cottrell |
| 2002/0011923 A1 | 1/2002 | Cunningham et al. |
| 2002/0022991 A1 | 2/2002 | Sharood et al. |
| 2002/0060701 A1 | 5/2002 | Naughton et al. |
| 2002/0082746 A1 | 6/2002 | Schubring et al. |
| 2002/0092779 A1 | 7/2002 | Essalik et al. |
| 2002/0096572 A1 | 7/2002 | Chene et al. |
| 2002/0138184 A1 | 9/2002 | Kipersztok et al. |
| 2002/0171624 A1 | 11/2002 | Stecyk et al. |
| 2002/0173929 A1 | 11/2002 | Seigel |
| 2003/0000692 A1 | 1/2003 | Takaski et al. |
| 2003/0014179 A1 | 1/2003 | Szukala et al. |
| 2003/0033156 A1 | 2/2003 | McCall |
| 2003/0033230 A1 | 2/2003 | McCall |
| 2003/0034897 A1 | 2/2003 | Shamoon et al. |
| 2003/0034898 A1 | 2/2003 | Shamoon et al. |
| 2003/0070544 A1 | 4/2003 | Mulvaney et al. |
| 2003/0074489 A1 | 4/2003 | Steger et al. |
| 2003/0103075 A1 | 6/2003 | Rosselot |
| 2003/0121652 A1 | 7/2003 | Carey et al. |
| 2003/0123224 A1 | 7/2003 | LaCroix et al. |
| 2003/0136135 A1 | 7/2003 | Kim et al. |
| 2003/0142121 A1 | 7/2003 | Rosen |
| 2003/0150926 A1 | 8/2003 | Rosen |
| 2003/0150927 A1 | 8/2003 | Rosen |
| 2003/0177012 A1 | 9/2003 | Drennan |
| 2004/0193324 A1 | 3/2004 | Hoog et al. |
| 2004/0074978 A1 | 4/2004 | Rosen |
| 2004/0133314 A1* | 7/2004 | Ehlers .................. G06Q 10/10 700/276 |
| 2004/0138793 A1* | 7/2004 | Taguchi ............ B60C 23/0416 701/29.3 |
| 2004/0245352 A1 | 12/2004 | Smith |
| 2004/0262410 A1 | 12/2004 | Hull |
| 2005/0083168 A1 | 4/2005 | Breitenbach |
| 2005/0270151 A1 | 12/2005 | Winick |
| 2006/0032379 A1 | 2/2006 | Kates |
| 2006/0071086 A1 | 4/2006 | Kates |
| 2006/0156392 A1 | 7/2006 | Baugher |
| 2006/0168342 A1 | 7/2006 | Budde et al. |
| 2006/0186213 A1 | 8/2006 | Carey et al. |
| 2006/0196953 A1 | 9/2006 | Simon et al. |
| 2006/0219799 A1 | 10/2006 | Schultz et al. |
| 2006/0242591 A1 | 10/2006 | Van Dok et al. |
| 2007/0013534 A1 | 1/2007 | DiMaggio |
| 2007/0029397 A1 | 2/2007 | Mueller et al. |
| 2007/0043478 A1 | 2/2007 | Ehlers et al. |
| 2007/0045429 A1 | 3/2007 | Chapman et al. |
| 2007/0114293 A1 | 5/2007 | Gugenheim |
| 2007/0114295 A1 | 5/2007 | Jenkins |
| 2007/0277061 A1 | 11/2007 | Ashe |
| 2007/0278320 A1 | 12/2007 | Lanacek et al. |
| 2007/0289731 A1 | 12/2007 | Deligiannis et al. |
| 2008/0015740 A1 | 1/2008 | Osann |
| 2008/0052764 A1 | 2/2008 | Huotari et al. |
| 2008/0211663 A1 | 9/2008 | Mansfield et al. |
| 2009/0045939 A1 | 2/2009 | Holland et al. |
| 2009/0062964 A1* | 3/2009 | Sullivan ................ G05B 15/02 700/276 |
| 2009/0065596 A1* | 3/2009 | Seem .................... F24F 11/30 236/51 |
| 2009/0140054 A1 | 6/2009 | Seemuller |
| 2009/0140056 A1 | 6/2009 | Leen |
| 2009/0140057 A1 | 6/2009 | Leen |
| 2009/0140059 A1 | 6/2009 | Barton et al. |
| 2009/0140060 A1 | 6/2009 | Stoner et al. |
| 2009/0140062 A1 | 6/2009 | Amundson et al. |
| 2009/0140063 A1 | 6/2009 | Koster et al. |
| 2009/0143879 A1 | 6/2009 | Amundson et al. |
| 2009/0143880 A1 | 6/2009 | Amundson et al. |
| 2009/0143916 A1 | 6/2009 | Boll et al. |
| 2009/0165644 A1 | 7/2009 | Campbell |
| 2009/0199212 A1 | 8/2009 | Schneider |
| 2010/0008422 A1 | 1/2010 | Shimizu et al. |
| 2010/0084482 A1 | 4/2010 | Kennedy et al. |
| 2010/0107112 A1 | 4/2010 | Jennings et al. |
| 2010/0114383 A1* | 5/2010 | Rosca .................... H04L 67/12 700/276 |
| 2010/0161574 A1 | 6/2010 | Davidson et al. |
| 2010/0197238 A1 | 8/2010 | Pathuri et al. |
| 2010/0204834 A1 | 8/2010 | Comerford et al. |
| 2010/0231361 A1 | 9/2010 | Bell |
| 2010/0280667 A1 | 11/2010 | Steinberg |
| 2011/0061527 A1 | 3/2011 | Sullivan |
| 2011/0078515 A1 | 3/2011 | Yasukawa |
| 2011/0093424 A1 | 4/2011 | Zimmermann et al. |
| 2011/0185895 A1 | 8/2011 | Freen |
| 2011/0276533 A1* | 11/2011 | Ludwig ................ G06Q 10/06 707/600 |
| 2012/0066168 A1 | 3/2012 | Fadell et al. |
| 2012/0080859 A1 | 4/2012 | Tai |
| 2012/0318073 A1 | 12/2012 | Zovdny et al. |
| 2012/0318135 A1 | 12/2012 | Hoglund et al. |
| 2012/0318137 A1 | 12/2012 | Ragland et al. |
| 2012/0318138 A1 | 12/2012 | Bisson et al. |
| 2012/0319851 A1 | 12/2012 | Hoglund et al. |
| 2012/0323374 A1 | 12/2012 | Dean-Hendricks et al. |
| 2012/0323375 A1 | 12/2012 | Dean-Hendricks et al. |
| 2012/0323377 A1 | 12/2012 | Hoglund et al. |
| 2013/0060387 A1 | 3/2013 | Imes et al. |
| 2013/0151019 A1 | 6/2013 | Federspiel |
| 2013/0158714 A1 | 6/2013 | Barton et al. |
| 2013/0158715 A1 | 6/2013 | Barton et al. |
| 2013/0158717 A1 | 6/2013 | Zywicki et al. |
| 2013/0158718 A1 | 6/2013 | Barton et al. |
| 2013/0158720 A1 | 6/2013 | Zywicki et al. |
| 2013/0204440 A1* | 8/2013 | Fadell ................... F24F 11/30 700/276 |
| 2013/0223279 A1 | 8/2013 | Tinnakornsrisuphap et al. |

(56) References Cited

U.S. PATENT DOCUMENTS

| | | |
|---|---|---|
| 2013/0245838 A1 | 9/2013 | Zywicki et al. |
| 2014/0031991 A1 | 1/2014 | Bergman et al. |
| 2017/0045899 A1 | 2/2017 | Zywicki et al. |

FOREIGN PATENT DOCUMENTS

| | | |
|---|---|---|
| EP | 434926 B1 | 8/1995 |
| EP | 678204 B1 | 3/2000 |
| EP | 985994 A1 | 3/2000 |
| EP | 1033641 A1 | 9/2000 |
| EP | 1143232 A1 | 10/2001 |
| EP | 1074009 B1 | 3/2002 |
| EP | 2138919 A1 | 12/2009 |
| FR | 2711230 A1 | 4/1995 |
| WO | 9711448 A1 | 3/1997 |
| WO | 9739392 A1 | 10/1997 |
| WO | 0043870 A2 | 7/2000 |
| WO | 0152515 A1 | 7/2001 |
| WO | 0179952 A1 | 10/2001 |
| WO | 0223744 A2 | 3/2002 |
| WO | 2010021700 A1 | 2/2010 |

OTHER PUBLICATIONS

White-Rodgers, "Comfort-Set 90 Series Premium," 4 pages, prior to Apr. 21, 2005.
White-Rodgers, "Installation Instructions for Heating & Air Conditioning IF78 Non-Programmable Thermostat," 6 pages, prior to Apr. 21, 2005.
Trane, "Wireless Zone Sensor. Where Will Wireless Technology Take You?," 4 pages, Feb. 2006.
AED Electronics, Inc., "Presenting Climatouch the Most Innovative Thermostat in the World!," 2 pages, prior to Nov. 30, 2007. Andrews eta!., "Clicky: User-Centric Input for Active Spaces," 17 pages, Aug. 2004.
Carrier, "Edge Performance Programmable Owner's Manual," 64 pages, 2007.
Logitech, "Harmony 880 Remote User Manual, " v. 1, pp. 1-15, prior to Nov. 30, 2007.
Lux, "9000RF Remote Instructions," 2 pages, prior to Nov. 30, 2007.
Totaline, "P474-1100RF, P474-1100REC Wireless Thermostat," 1 page, prior to Nov. 30, 2007.
Totaline, "Wireless Remote Sensor, Model P474-0401-1RF/REC," 2 pages, prior to Nov. 30, 2007.
Hunter, "Model 44758 Remote Sensor," Owner's Manual, Form No. 44044-01, 2 pages, Sep. 4, 2008.
Saravanan et al., "Recontigurable Wireless Interface for Networking Sensors," IJCSNS International Journal of Computer Science and Network Security, vol. 8 No. 7, pp. 270-276, revised Jul. 20, 2008.
Screenshot of http://lagotek.corn/index. html?currentSection TouchIt, Lagotek, 1 page, prior to Mar. 29, 2012.
Smartac, "Thermostat Programming Web Site Guide," PG-WC-7E, 2 pages, 2009.
"Comfort Programmable Owner's Manual," Carrier Touch-N Go, Catalog No. OM-TCPHP-4CA, Replaces: OM-TCPHP-3CA, 60 pages,2010.
Honeywell, "Total Connect Online Help Guide," Revision A, 800-02577-TC, Mar. 2010.
Honeywell, "Installation Guide: Wireless Entry/Exit Remote," 12 pages, 2011.
Honeywell, "RedLINK Wireless Comfort Systems," RedLINK Wireless Technology, 8 pages, Aug. 2011.
HTML, Hunter Thermostat 44668 Specifications, and 44758 Specifications, 2 Pages, Printed Jul. 13, 2011. http://www.cc.gatech.edu/computing/classes/cs6751_94_fall/groupc/climate-2/nodel.htrnl, "Contents," 53 pages, printed Sep.
Fluke, "561 HVAC Pro Infrared Thermometer User's Manual," 22 pages, downloaded May 24, 2012.

Harris et al., "Optimizing Memory Transactions," Microsoft Research Harvard University, 12 pages, May 25, 2012.
Honeywell, "Total Connect User Guide," Revision B, 34 pages, May 15, 2012.
Honeywell, "VisionPRO® 8000 Thermostats," 2 pages, downloaded from: http://yourhome.honeywell.com, May 24, 2012.
Honeywell, "W7006A Home Controller Gateway User Guide," 31 pages, Jul. 2001.
Larsson, "Battery Supervision in Telephone Exchanges," Ericsson Components AB Sweden, 5 pages, Downloaded May 5, 2012.
Lennox, "Network Control Panel (NCP)," User's Manual, 18 pages, Nov. 1999.
Lennox, "Prodigy Control System," Lennox Industries, 4 pages, May 25, 2012.
"Spotlight on Integrated Systems," Custom Builder, V8, N2, p. 66(6), Mar.-Apr. 1993.
Gentex Corporation, "9000 Series, Photoelectric Type Single Station/Multi-Station Smoke Alarms AC Powered with Battery Backup, Installation Instructions—Dwner's Information," pp. 9-1 to 9-6, Jan. 1, 1993.
Carrier Microelectronic Programmable Thermostat Owner's Manual, pp. 1-24, May 1994.
Honeywell News Release, "Honeywell's New Sysnet Facilities Integration System for Boiler Plant and Combustion Safety Processes," 4 pages, Dec. 15, 1995.
Honeywell, "Excel Building Supervisor-Integrated R7044 and FS90 Ver. 2.0," Operator Manual, 70 pages, Apr. 1995.
Honeywell T8602A,B,C,D and TS8602A,C Chronotherm III Fuel Saver Thermostats, Installation Instructions, pp. 1-12, 1995. Honeywell T8602D Chronotherm IV Deluxe Programmable Thermostats, Installation Instructions, pp. 1-12, 2002.
Honeywell CT8602C Professional Fuel Saver Thermostat, pp. 1-6, 1995.
Cardio by Secant, http://www.hometoys.com/htinews/apr98/reviews/cardio.htrn, "HTINews Review," Feb. 1998, 5 pages, printed Sep. 14, 2004.
Carrier, "Programmable Dual Fuel Thermostats," Installation, StartUp & Operating Instructions, pp. 1-12, Oct. 1998.
Carrier, "Programmable Thermostats," Installation,Start-Up & Operating Instructions, pp. 1-16, Sep. 1998.
Carrier, "Standard Programmable Thermostat," Homeowner's Manual, pp. 1-8 pages, 1998.
Metasys, "HVAC PRO for Windows User's Manual," 308 pages, 1998.
Totaline, "1 for All Programmable Digital Thermostat," Owner's Manual PIN P374-1100FM, 23 pages, Nov. 1998.
Totaline, "1 for All Programmable Digital Thermostat," Owner's Manual PIN P474-1050, 21 pages, Nov. 1998.
Totaline, "Instructions PIN P474-1010" , Manual, 2 pages, Dec. 1998.
Totaline, "Programmable Thermostat", Homeowner's Guide, 27 pages, Dec. 1998.
Totaline Star CPE230RF, Commercial Programmable Thermostat Wireless Transmitter, Owner's Manual, pp. 1-16, Oct. 1998. Totaline Star PIN P474-0130 Non-Programmable Digital Thermostat Owner's Manual, pp. 1-22, prior to Apr. 21, 2005.
"HTI News Release," http://www.hometoys.com/htinews/apr99/releases/ha101.htrn, 3 pages, Apr. 1999.
"Product Review—Philips Pronto Remote Control," http://hometheaterhifi.corn/volume_6_2/philipsprontoremotecontrol. htrnl, 5 pages, dated May 1999, printed Aug. 20, 2004.
"RC X10 Automation Forum: Control your Heating and Cooling System with Pronto (111)," http://www.remotecentral.com/cgi-bin/mboard!rc-x10/thread.cgi?12, 2 pages, dated Apr. 23, 1999, printed Aug. 20, 2004.
Vantage Expands Controls for AudioNideo, HVAC and Security http://www.hometoys.corn/htinews/aug99/releases/vantage03.htm, 2 pages, dated Aug. 3, 1999, printed Aug. 20, 2004.
Business Wire, "MicroTouch Specialty Products Group to Capitalize on Growing Market for Low-Cost Digital Matrix Touchscreens," p. II74 (2 pages), Jan. 6, 1999.
Carrier, "Thermidistat Control," Installation, Start-Up, and Operating Instructions, pp. 1-12, Aug. 1999.

(56) References Cited

OTHER PUBLICATIONS

Totaline, "Programmable Thermostat Configurable for Advanced Heat Pump or Dual Fuel Operation," Owner's Manual PIN P374-1500, 24 pages, Jun. 1999.
Visor Handheld User Guide, 280 Pages, Copyright 1999-2000.
Warmly Yours, "Model TH111GFCI-P (120 VAC)," Manual, pp. 1-4, prior to Jul. 7, 2004.
"High-tech options take hold in new homes—Aug. 28, 200—Dallas Business Journal," http://bizjournals.corn/dallas/stories/2000/08/28/focus4, 3 pages, dated Aug. 28, 2000, printed Aug. 19, 2004. "Home Toys Review—TouchLinc," http://www.hometoys.com/ htinews/aug99/reviews/ touchlinc/ touchlinc.htm, 3 pages, dated Aug. 1999, printed Aug. 20, 2004.
"Mark of Excellence Award Finalist Announced," http://64.233.167.104/search?Q cache:ciOA2YtYaBIJ.www.hometoys.com/releases/ mar . . . ,6 pages, Leopard Touchscreen on p. 2, dated prior to Mar. 4, 2000, printed Aug. 20, 2004.
Adicon 2500, "The Automator," 4 pages, Oct.-Dec. 2000.
BRK Electronics Maximum Protection Plus Ultimate Convenience Smoke Alarm, 24 pages, Sep. 2000.
Honeywell, "Introduction of the S7350A Honeywell WebPAD Information Appliance," Home and Building Control Bulletin, 2 pages, Aug. 29, 2000; Picture of WebPad Device with touch screen, 1 page; and screen shots of WebPad Device, 4 pages.
Totaline, "Wireless Programmable Digital Thermostat," Owner's Manual 474-1100RF, 22 pages, 2000.
"CorAccess Systems/In Home," http://web.archive.org/web20011212084427/www.coraccess.com/home.htrnl, page, copyright 2001, printed Aug. 19, 2004.
ADI, "Leopard User Manual," 93 pages, 2001.
ADT Security Services, "iCenter Advanced User Interface 142ADT," Installation and Setup Guide, 4 pages, May 2001; First Sale Feb. 2001.
Aube Technologies, Electronic Thermostat for Heating System Model TH135-01, 5 pages, Aug. 14, 2001.
Blake et a!., "Seng 310 Final Project" Report, dated Apr. 6, 2001.
Blister Pack Insert from a Ritetemp 8082 Touch Screen Thermostat Product, 2 pages, 2002.
Blake eta!., "Seng 310 Final Project Demo Program" Illustration, 3 pages, Apr. 6, 2001.
Braeburn Model 3000 Owner's Manual, pp. 1-13, 2001. Braeburn Model 5000 Owner's Manual, pp. 1-17, 2001.
Dekoven eta!., "Designing Collaboration in Consumer Products," 2 pages, 2001.
Freudenthal et al., "Communicating Extensive Smart Home Functionality to Users of All Ages: the Design of a Mixed-Initiative Multimodal Thermostat-Interface," pp. 34-39, Mar. 12-13, 2001.
Gentex Corporation, "HD135, 135 Fixed Temperature Heat Detector AC Powered, 120V, 60Hz with Battery Backup, nstallation Instructions—Dwner's Information," pp. 1-5, Jun. 1, 1998.
Honeywell, MagicStat® CT3200 Programmable Thermostat, Installation and Programming Instructions, pp. 1-24, 2001. Honeywell, Wireless Entry/Exit Remote, Operating Manual, 9 pages, 2011.
Totaline, "1 for All Programmable Digital Thermostat," Owner's Manual PIN P374-1100, 24 pages, Apr. 2001.
Totaline, "Intellistat Combination Temperature and Humidity Control," Owner's Manual PIN P374-1600, 25 pages, Jun. 2001.
Totaline, "PIN P374-0431 Thermostat Remote Control and Receiver," Owner's Manual, 11 pages, prior to Nov. 30, 2007.
BRK First Alert, User's Manual, Smoke and Fire Alarms, pp. 1-7, Nov. 2002.
Coraccess, "Companion 6," User Guide, pp. 1-20, Jun. 17, 2002.
Danfoss RT51151RF & RT52/52RF User Instructions, 2 pages, Jun. 2004.
Dekoven et a!., "Measuring Task Models in Designing Intelligent Products," 2 pages, Jan. 13-16, 2002.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell T8002 Programmable Thermostat, Installation Instructions, pp. 1-8, 2002.
Install Guide for Ritetemp Thermostat 8082, 6 pages, 2002.
Mounting Template for Ritetemp Thermostat 8082, 1 Page, 2002.
Omron Electronic Components, LLC, "Micro Tilt Sensor D6B," Cat. No. B02WAD1, 2 pages, Jun. 2002.
Quick Start Guide for Ritetemp Thermostat 8082, 1 page, 2002.
Remote Control Power Requirement for Ritetemp Thermostat 8082, 1 page, 2002.
Ritetemp Operation 8029, 3 pages, Jun. 19, 2002. Ritetemp Operation 8050, 5 pages, Jun. 26, 2002. Ritetemp Operation 8085,pp. 1-6, prior to Apr. 21, 2005.
Trane, "System Programming, Tracer Sununit Version 14, BMTW SVPOID-EN," 623 pages, 2002.
Trouble Shooting Guide for Ritetemp Thermostat 8082, 1 page, 2002.
Aprilaire "Electronic Thermostats Models 8344, 8346, 8348, 8363, 8365, 8366 Operating Instructions," 8 pages, 2003.
DESA Heating Products, "Wireless Hand-Held Remote Control Sets Models (C) GHRCB and (C) GHRCTB, Operating Instruc tions," 4 pages, May 2003.
Honeywell Electronic Programmable Thermostat, Owner's Guide, pp. 1-20, 2003.
Honeywell Electronic Programmable Thermostats, Installation Instructions, pp. 1-8, 2003.
Totaline Model P474-1035 Owner's Manual Programmable 5-2 Day Digital Thermostat, pp. 1-21, Apr. 2003.
Travis Industries, Remote Fireplace Thermostat, Part #99300651, 6 pages, printed Feb. 3, 2003.
http://www.ritetemp.info/rtMenu_13.htm1, Rite Temp 8082, 6 pages, printed Jun. 20, 2003.
"HAI Company Background," http://www.homeauto.com/ AboutHAI/ abouthai_main.htrn, 2 pages, printed Aug. 19, 2004.
AUBE Technologies, TH140-28 Electronic Programmable Thermo Stat, Installation Instructions and User Guide, pp. 1-4, Jan. 22, 2004.
autornatedbuildings.com Article—"Thin Client Solutions, Pres sure, Air Flow, Temperature, Humidity & Valves," Dwyer Instru ments, Inc., 5 pages, printed Sep. 20, 2004.
Cardio Manual, available at http://www.secant.ca/En/Documentation/ Cardio2e-Manual.pdf, Cardio Home Automation Inc., 55 pages, printed Sep. 28, 2004.
Clirnatouch, User Manual, Climatouch CT03TSB Thermostat, Clirnatouch CT03TSHB Thermostat with Humidity Control, Out door UHF Temperature Transmitter 217S31, 19 pages, printed Sep. 15, 2004.
Domotique Secant Home Automation—Web Page, available at http://www.secant.ca/En/Company/ Default.asp,1 page, printed Sep. 28, 2004.
http://www.thermostatsales.com, Robertshaw, "9700 Deluxe Programmable Thermostat" 3 Pages, Printed Jun. 17, 2004. http://www.thermostatsales.com, Robertshaw, "9710 Deluxe Programmable Thermostat," 3 Pages, Printed Jun. 17, 2004. http://www.thermostatsales.com, Robertshaw, "9720 Deluxe Programmable Thermostat," 3 pages, printed Jun. 17, 2004.
http://www.thermostatsales.com, RobertShaw, "9610 Digital Programmable Thermostat," 3 pages, printed Jun. 17, 2004.
Hunter, "44200/44250," Owner's Manual, 32 pages, prior to Jul. 7, 2004.
Hunter, "44300/44350," Owner's Manual, 35 pages, prior to Jul. 7, 2004.
Hunter, "Auto Saver 550," Owner's Manual Model 44550, 44 pages, prior to Jul. 7, 2004.
Honeywell TH8000 Series Programmable Thermostats, Owner's Guide, pp. 1-44, 2004.
Invensys, "9700i 9701i 9715i 9720i Deluxe Programmable Thermostats," User's Manual, pp. 1-28, prior to Jul. 7, 2004.
Lux, "511 Series Smart Temp Electronic Thermostat," Owner's Manual, 3 pages, prior to Jul. 7, 2004.
Lux, "600 Series Smart Temp Electronic Thermostat," Owner's Manual, 3 pages, prior to Jul. 7, 2004.
Lux, "602 Series Multi-Stage Programmable Thermostat," Owner's Manual, 2 pages, prior to Jul. 7, 2004.

(56) References Cited

OTHER PUBLICATIONS

Lux, "605/2110 Series Programmable Heat Pump Thermostat," Owner's Manual, 3 pages, prior to Jul. 7, 2004.
Lux, "700/9000 Series Smart Temp Electronic Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.
Lux ELV1 Programmable Line Voltage Thermostat, Installation Instructions, 3 pages, prior to Jul. 7, 2004.
Proliphix, "Web Enabled IP Thermostats, Intelligent HVAC Con Trol," Proliphix Inc., 2 Pages, On or Before Aug. 28, 2004.
Proliphix, "Web Enabled IP Thermostats, Ultimate in Energy Efficiency!," Proliphix Inc., 2 Pages, On or Before Aug. 28, 2004.
Proliphix, Inc., "NT10e & NT20e," 54 pages, On or before Aug. 30, 2005.
Pump Thermostat, Installation and Operation Instructions, 8 pages, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.
White-Rodgers, 1F81-261 "Programmable Electronic Digital Multi-Stage Thermostat," Installation and Operation Instructions, 8 pages, prior to Jul. 7, 2004.
White-Rodgers, "Comfort-Set 90 Series Thermostat," Manual, pp. 1-24, prior to Jul. 7, 2004.
White-Rodgers, "Installation Instructions for Heating & Air Conditioning IF72 5/2 Day Programmable Heat Pump Thermostat," 8 pages, prior to Jul. 7, 2004.
White-Rodgers, "Installation Instructions for Heating & Air Conditioning IF78 5/2 Day Programmable Thermostat," 7 pages, prior to Jul. 7, 2004.
White-Rodgers Comfort-Set III Thermostat, pp. 1-44, prior to Jul. 7, 2004.
www.icmcontrols.com, Simplecomfort, 5C3006 Single Stage Heat/ Single Stage Cool or Single Stage Heat Pump/ Manual Changeover, 1 page, prior to Jul. 7, 2004.
www.icmcontrols.com, Simplecomfort, SC3000 Single Stage Heat/ Single Stage Cool or Single Stage Heat Pump/ Manual Changeover, 1 page, prior to Jul. 7, 2004.
www.icmcontrols.com, Simplecomfort, SC3001 Single Stage Heat/ Single Stage Cool or Single Stage Heat Pump/ Manual Changeover, 1 page, prior to Jul. 7, 2004.
www.icmcontrols.com, Simplecomfort, SC3201 2 Stage Heat Pump Manual Changeover, 1 page, prior to Jul. 7, 2004. www.icmcontrols.com, Simplecomfort, SC3801 2 Stage Heat/2 Stage Cool 2 Stage Heat Pump/Audio Changeover, 1 page, prior to Jul. 7, 2004.
Carrier TSTATCCRF01 Programmable Digital Thermostat, pp. 1-21, prior to Apr. 21, 2005.
Cat. No. JB301-E3-01, 6 pages, Mar. 2005.
Firex Smoke Alarm, Ionization Models AD, ADC Photoelectric Model Pad, 4 pages, prior to Apr. 21, 2005.
Lux TX9000 Installation, 3 pages, prior to Apr. 21, 2005.
Sealed Unit Parts Co., Inc., Supco & CTC Thermostats . . . Loaded With Features, Designed for Value!, 6 Pages, Prior to Apr. 21, 2005.
Sharp Corporation, "GP1S036HEZ Phototransistor Output, Transmissive Photointerrupter with Tilt Direction (4-Direction) Detecting," pp. 1-11, Oct. 3, 2005.
"RCS X10 Thermostat Plug-In for Home Seer Beta Version," 25 pages, Downloaded Sep. 9, 2011.
Emme Core User Guide, Version 1.1, 47 pages, Jan. 2011.
Inventek, "Inventek Systems, ISM4319-M3X-L44-X Embedded Serial-to-Wi-Fi Module eS-WiFi 802.11 b/g/n. Data Sheet," Inventek: Billerica, Feb. 6, 2012 (accessed from <<http://www.inventeksys.com/wp-content/uploads/2013/02/ISM4319_M3x_I44_Functional_Spec.pdf>> on Jul. 25, 2016).
Lux TX500 Series Smart Temp Electronic Thermostat, 3 pages, prior to Jul. 7, 2004.
Lux, "PSPH521 Series Programmable Heat Pump Thermostat," Owner's Manual, 3 pages, prior to Jul. 7, 2004.
Operation Manual for Ritetemp Touch Screen Thermostat 8082, 8 pages, 2002.
Screenshot of http://lagotek.com/index.html?currentSection=TouchIt, Lagotek, 1 page, prior to Mar. 29, 2012.
White-Rodgers, 1F82-261 "Programmable Electronic Digital Heat Pump Thermostat," Installation and Operation Instructions, 8 pages, prior to Jul. 7, 2004.
Prosecution History from U.S. Appl. No. 13/434,778, dated Nov. 4, 2014 through Jun. 27, 2016, 121 pp.
Prosecution History from U.S. Appl. No. 15/340,756, dated Jun. 2, 2017 through Jan. 12, 2018, 54 pp.

\* cited by examiner

METHOD AND SYSTEM FOR CONFIGURING WIRELESS SENSORS IN AN HVAC SYSTEM

This application is a continuation of U.S. patent application Ser. No. 15/340,756, filed Nov. 1, 2016, and entitled "METHOD AND SYSTEM FOR CONFIGURING WIRELESS SENSORS IN AN HVAC SYSTEM", which is a continuation of U.S. patent application Ser. No. 13/434,778, filed Mar. 29, 2012, entitled "METHOD AND SYSTEM FOR CONFIGURING WIRELESS SENSORS IN AN HVAC SYSTEM", now U.S. Pat. No. 9,488,994, issued Nov. 8, 2016, both of which are incorporated herein by reference.

TECHNICAL FIELD

The present disclosure relates generally to HVAC systems, and more particularly, to methods and systems for configuring wireless devices in an HVAC system.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. Some HVAC systems rely on one or more sensors located at various locations in or around the building to facilitate control of the one or more environmental conditions within the building.

SUMMARY

The present disclosure relates generally to HVAC systems, and more particularly, to methods and systems for configuring wireless devices in an HVAC system. In some instances, an HVAC system may include a building controller (e.g. a thermostat) and one or more wireless devices, such as a temperature sensor, a humidity sensor, an equipment interface module and/or any other suitable wireless sensor or device. The building controller may be configured to control one or more components of an HVAC system of a building. In some cases, the building controller may include a memory, a temperature sensor, an I/O block for sending and/or receiving signals to and/or from one or more components of the HVAC system including the one or more wireless devices, a controller, and a user interface having a display. The controller may be coupled to the user interface, the memory, the temperature sensor, and the I/O block.

In some cases, the controller may be configured to enroll the one or more wireless devices, and once the one or more wireless devices are enrolled, may solicit an identifier from a user for at least one of the one or more wireless devices via the user interface of the building controller. Upon acceptance of an identifier for the at least one of the one or more enrolled wireless devices, the controller may be configured to store the accepted identifiers(s) in the memory of the building controller. In some cases, the controller may be configured to display a sequence of two or more screens on the display, wherein each of the two or more screens solicit information about at least one of the one or more wireless devices. The two or more screens may prompt the user to enter an identifier, a location, a device type and/or function of one or more wireless devices.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

Figure 1:
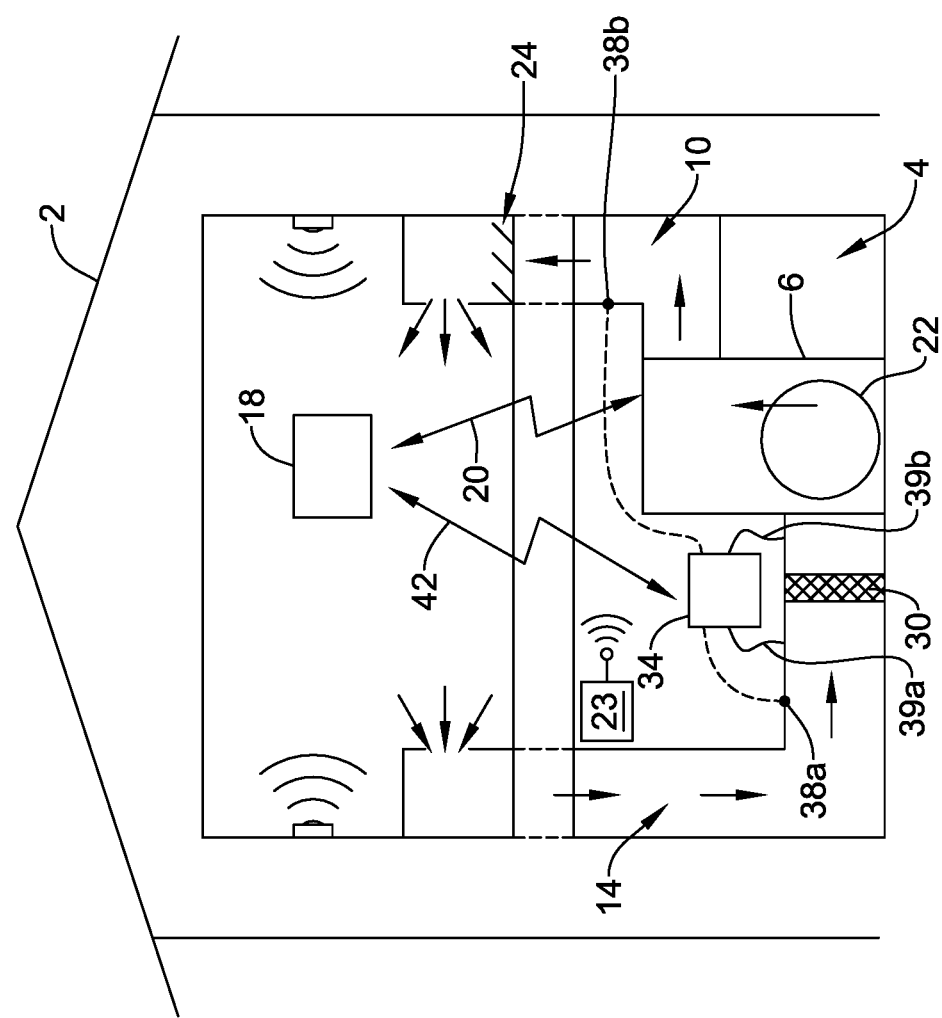
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The detailed description and drawings show several embodiments which are meant to illustrative in nature.

FIG. 1 is a schematic view of a building 2 having an illustrative heating, ventilation, and air conditioning (HVAC) system 4. While FIG. 1 shows a typical forced air type HVAC system 4, other types of HVAC systems are contemplated including, but not limited to, boiler systems, radiant heating systems, electric heating systems, cooling systems, heat pump systems, and/or any other suitable type of HVAC system 4, as desired. The illustrative HVAC system 4 of FIG. 1 includes one or more HVAC components 6, a system of ductwork and air vents including a supply air duct 10 and a return air duct 14, and at least one HVAC controller 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. The HVAC controller(s) may wirelessly communicate with the one or more HVAC components(s) 6 following a wireless protocol such as, for example, cellular communication, ZigBee, Bluetooth, WiFi, IrDA, dedicated short range communication (DSRC), EnOcean, or any other suitable wireless protocols, as desired.

In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure.

An illustrative HVAC controller, which is not meant to be limiting in any way, is disclosed in: US Published Patent Application No. 20090140062, entitled "HVAC CONTROLLER THAT SELECTIVELY REPLACES OPERATING INFORMATION ON A DISPLAY WITH SYSTEM STATUS INFORMATION"; US Published Application No. 20090143880, entitled "HVAC CONTROLLER WITH CONTEXT SENSITIVE HELP SCREENS"; US Published Application No. 20090143918, entitled "METHOD AND APPARATUS FOR CONFIGURING AN HVAC CONTROLLER"; US Published Application No. 20090143916, entitled "HVAC CONTROLLER HAVING A PARAMETER ADJUSTMENT ELEMENT WITH A QUALITATIVE INDICATOR"; US Published Application No. 20090143879, entitled "HVAC CONTROLLER WITH PARAMETER CLUSTERING"; US Published Application No. 20090140056, entitled "HVAC CONTROLLER WITH QUICK SELECT FEATURE," the entireties of which are incorporated herein by reference for all purposes.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an optional communications gateway or other device 23 that may allow one or more of the HVAC components 6, as described herein, to communicate wirelessly with one another in accordance with a wireless communications protocol such as, for example, cellular communication, ZigBee, Bluetooth, WiFi, IrDA, dedicated short range communication (DSRC), EnOcean, or any other suitable wireless protocols, as desired. In some cases, the communications gateway 23 may facilitate communication between the various HVAC components 6 over a local area network (LAN), a wide area network (WAN), or the internet. These are just some examples.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components 6 to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component 6.

In some cases, and as shown in FIG. 1, the illustrative HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating mode may be calculated by subtracting the return air temperature from the discharge air temperature (e.g. delta T=discharge air temp.-return air temp.). For the cooling mode, the delta T may be calculated by subtracting the discharge air temperature from the return air temperature (e.g. delta T=return air temp.-discharge air temp.).

When provided, the equipment interface module 34 may be configured to communicate with the HVAC controller 18 via, for example, a wired or wireless communication link 42. In other cases, the equipment interface module 34 may be incorporated or combined with the HVAC controller 18. In either cases, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

Figure 2:
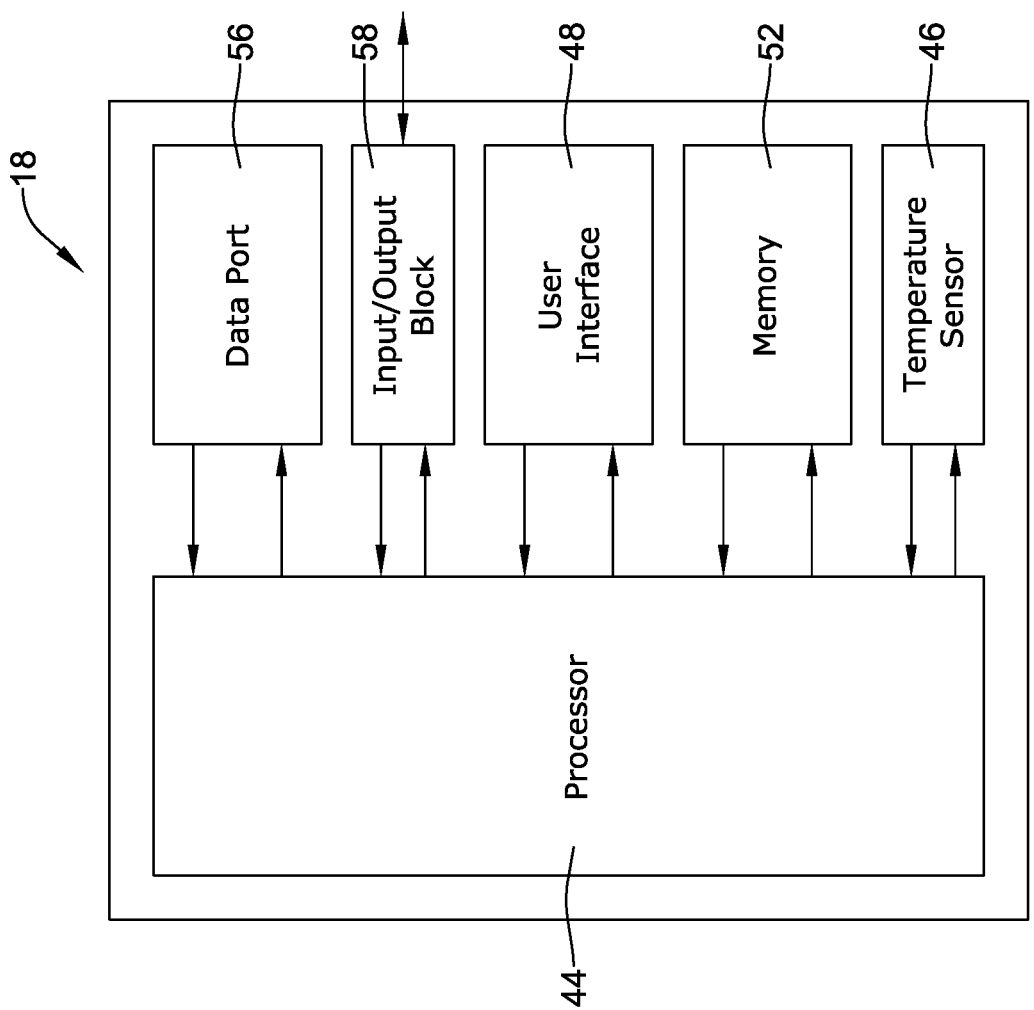
FIG. 2 is a schematic view of an illustrative HVAC controller.

FIG. 2 is a schematic view of an illustrative HVAC controller 18. In some instances, HVAC controller 18 may be a thermostat and may include a temperature and/or humidity sensor, but this is not required. In the illustrative embodiment of FIG. 2, HVAC controller 18 includes a controller (e.g. microprocessor, microcontroller, etc.) 44, a temperature sensor and/or humidity sensor 46, a user interface 48, and a memory 52. In some cases, the HVAC controller 18 may include an input/output block (I/O block) 58 for receiving one or more signals from the HVAC system and/or for providing one or more control signals to the HVAC system. The I/O block 58 may communicate with one or more HVAC components 6 of the HVAC system 4. In some cases, the I/O block 58 may communicate with another controller, which is in communication with one or more HVAC components 6 of the HVAC system 4, such as a zone panel in a zoned HVAC system. The I/O block 58 may also be configured to wirelessly communicate with one or more wireless devices. The controller 44 may be coupled to the user interface 48, the memory 52, the temperature sensor 46, and the I/O block 58.

The controller 44 of the illustrative HVAC controller 18 may operate in accordance with an algorithm that controls or at least partially controls one or more HVAC components 6 of an HVAC system such as, for example, HVAC system 4 shown in FIG. 1. The controller 44 may, for example, operate in accordance with an algorithm that provides temperature set points, starting and/or ending times, and the like. Additionally, in some cases, HVAC controller 18 may include a timer (not shown). The timer may be integral to the controller 44 or may be provided as a separate component.

In the illustrative embodiment of FIG. 2, the user interface 48 may be any suitable user interface that permits HVAC controller 18 to display and/or solicit information, as well as accept one or more user interactions with the HVAC controller 18. For example, the user interface 48 may permit a user to enter data such as temperature set points, humidity set points, starting times, ending times, diagnostic limits, conditions under which diagnostic limits may be suspended, responses to alerts, and the like. In some cases, the user interface 48 may include a display and a distinct keypad. A display may be any suitable display. In some instances, a display may include or may be a liquid crystal display (LCD), and in some cases a fixed segment display or a dot matrix LCD display. If desired, user interface 48 may be a touch screen LCD panel that functions as both display and keypad. In some instances, a touch screen LCD panel may be adapted to solicit values for a number of operating parameters and/or to receive such values, but this is not required.

The memory 52 of the illustrative HVAC controller 18 may be in communication with the controller 44. Memory 52 may be used to store any desired information, such as the aforementioned control algorithm, set points, schedule times, diagnostic limits such as, for example, differential pressure limits, delta T limits, and the like. Memory 52 may be any suitable type of storage device including, but not limited to, RAM, ROM, EPROM, flash memory, a hard drive, and/or the like. In some cases, controller 44 may store information within memory 52, and may subsequently retrieve the stored information.

In some cases, as illustrated in FIG. 2, HVAC controller 18 may include a data port 56. Data port 56 may be a wireless port such as a Bluetooth™ port or any other wireless protocol. In other cases, data port 56 may be a wired port such as a serial port, a parallel port, a CAT5 port, a USB (universal serial bus) port, and/or the like. In some instances, data port 56 may be a USB port and may be used to download and/or upload information from a USB flash drive or some other data source. Other remote devices may also be employed, as desired.

Data port 56 may be configured to communicate with controller 44 and may, if desired, be used to upload information to controller 44 and/or download information from controller 44. Information that can be uploaded and/or downloaded may include, for example, values of operating parameters. In some instances, data port 56 may be used to upload a previously-created thermostat configuration into HVAC controller 18, thereby hastening the programming process. In some cases, data port 56 may be used to download a thermostat configuration that has been created using HVAC controller 18, so that the thermostat configuration may be transferred to other similar thermostats, hastening their programming process. In some cases, data port 56 may be used to upload and/or download information pertaining to an HVAC dealer or contractor, if desired. In some cases, data port 56 may be used to download data stored within the memory 52 for analysis. For example, data port 56 may be used to download a faults and/or alerts log or parts thereof to a remote device such as a USB memory stick (also sometimes referred to as a thumb drive or jump drive), personal computer, laptop, iPAD® or other tablet computer, PDA, smart phone, or other remote device, as desired. In some cases, the data may be convertible to an MS EXCEL®, MS WORD®, text, XNL, and/or Adobe PDF® file, but this is certainly not required.

Figure 3:
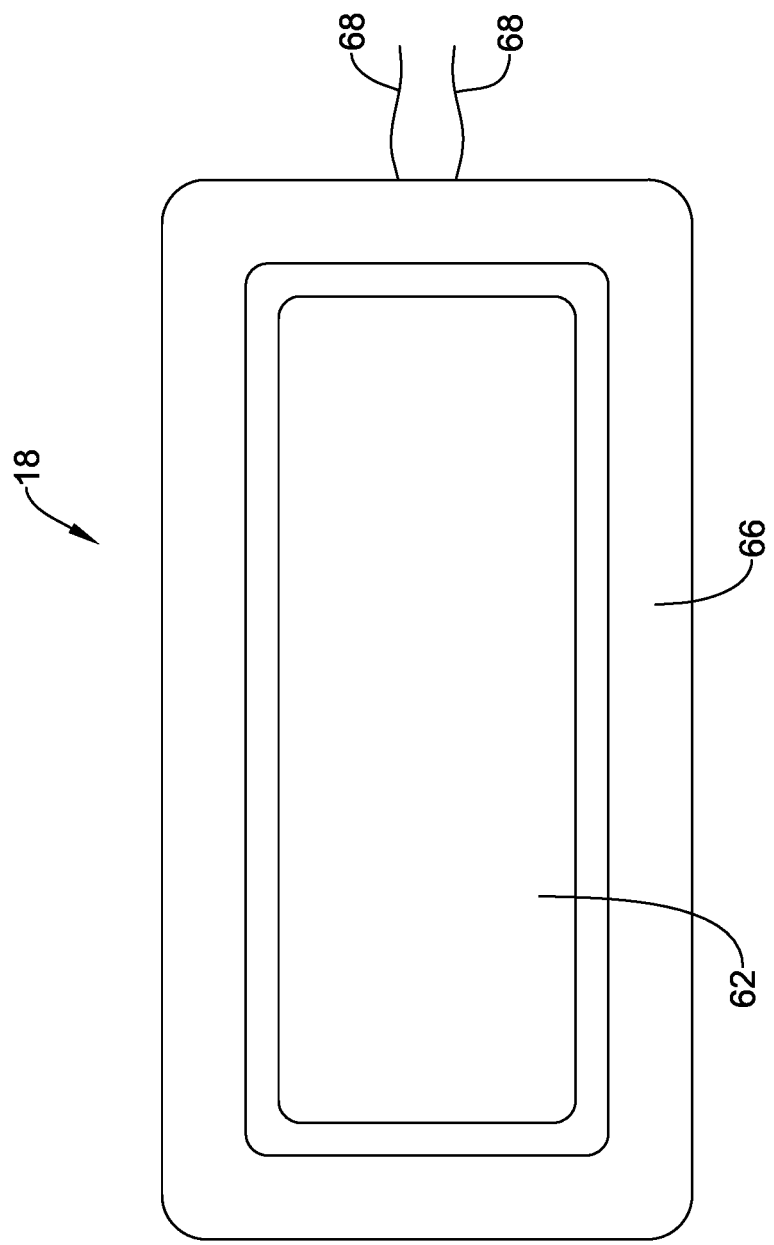
FIG. 3 is a front view of an illustrative HVAC controller.

FIG. 3 is a front view of an illustrative HVAC controller 18. In some cases, HVAC controller 18 may be configured to provide substantial display and/or programming functionality. In the example shown in FIG. 3, HVAC controller 18 may include a display 62 that is disposed within a housing 66 but viewable externally from the housing 66. In some cases, display 62 may be a touch screen LCD display. If desired, display 62 may be a dot matrix touch screen LCD display. A dot matrix touch screen LCD display is a touch screen LCD that permits images such as letters, numbers, graphics, images, and the like to be displayed anywhere on the LCD, rather than being confined to predetermined locations such as is the case with a fixed segment type of LCD display. Housing 66 may be formed of any suitable material, such as a polymeric material. In some cases, the housing 66 may be formed such that it defines a data port 56 (see FIG. 2). The housing 66 may also include suitable wiring and/or other electrical connections 68 such that the HVAC controller 18 may be electrically coupled to the HVAC system 4.

The HVAC system 4 may also include one or more wireless devices that may be configured to communicate and/or interact via a wireless communication link (e.g. I/O block 58) with the HVAC controller 18. Exemplary wireless devices that may be incorporated into the HVAC system 4 include, but are not limited to, temperature sensors, humidity sensors, gas sensors, an equipment interface module, another thermostat, a zone control panel, a damper, a valve, and/or any other suitable wireless sensor or device. In many cases, the one or more wireless devices may operate on battery power. In some cases, the one or more wireless devices may have a wired auxiliary source of back-up power in the event of battery failure.

Figure 4:
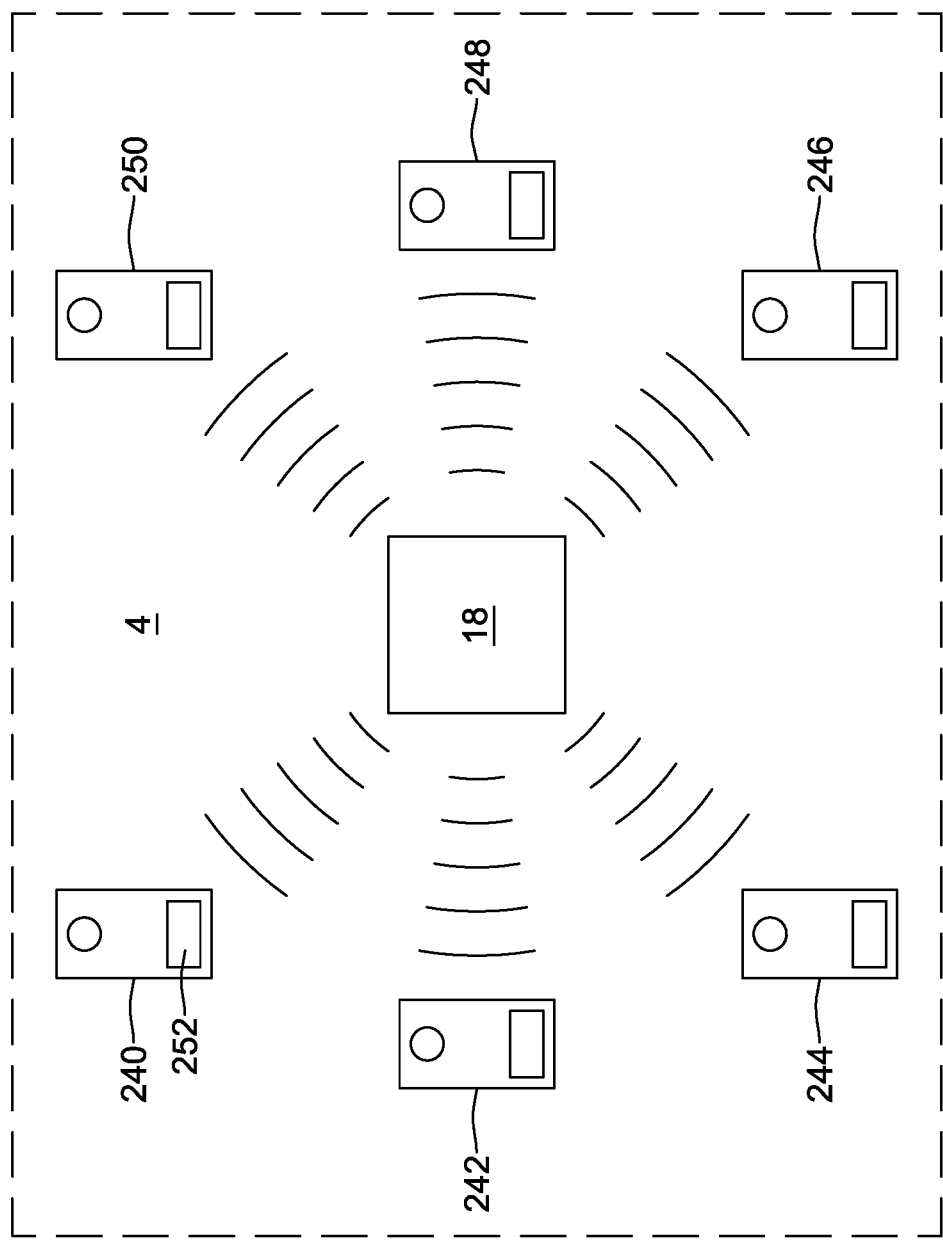
FIG. 4 is a schematic view of an HVAC system including a HVAC controller and a plurality of wireless devices connected to the HVAC controller.

FIG. 4 is a schematic view of a portion of the HVAC system 4 including an HVAC controller 18 and a number of wireless devices 240, 242, 244, 246, 248, and 250 in communication with the HVAC controller 18. As shown in FIG. 4, the one or more wireless devices 240, 242, 244, 246, 248, and 250 may include, but are not limited to, an indoor air temperature sensor 240, an outdoor air temperature sensor 242, an indoor humidity sensor 244, an outdoor humidity sensor 246, a remote control unit 248, a wireless adapter 520, and/or any other suitable wireless device or sensor. These are just some example wireless devices that may be connected to the HVAC controller 18 and incorporated into the HVAC system 4. In some cases, the HVAC system 4 may include indoor air temperature sensors 240 located at different locations throughout the building or structure 2. In the example shown in FIG. 1, the HVAC system 4 may include a wireless indoor air temperature sensor 40 mounted to a wall of the building or structure at a location that is remote from the HVAC controller(s) 18. In some cases, the HVAC system 4 may also include an outdoor temperature sensor 242 and/or an outdoor humidity sensor 246 installed at a location external to the building or structure 2. In some cases, a remote control unit 248 may be provided for communicating with and/or controlling the one or more wireless devices and/or HVAC controller 18, if desired.

In some cases, the one or more wireless devices 240, 242, 244, 246, 428, and/or 250 may be configured to send commands to the HVAC controller 18 via a one-way, wireless communication link. In other cases, the one or more wireless devices 240, 242, 244, 246, 428, and/or 250 may be configured to send and/or receive commands to and from the HVAC controller 18 via a two-way, wireless communication link. The communication link established between the one or more wireless devices 240, 242, 244, 246, 428, and/or 250 and the one or more HVAC controllers 18 may be a direct communication link, or alternatively, an indirect communication link where communication between the control unit and the one or more HVAC controllers 18 is routed through a communications device such as, for example, communications gateway 23 as shown in FIG. 1.

In some instances, the one or more wireless devices 240, 242, 244, 246, 428, and/or 250 may be installed at the same time as the HVAC controller(s) 18 (e.g. new installation). In other instances, the one or more wireless devices 240, 242, 244, 246, 428, and/or 250 may be installed in a building or structure that already has an existing HVAC controller(s) 18 (e.g. post-installation). In either case, a communication link may need to be established between the one or more wireless devices 240, 242, 244, 246, 428, and/or 250 and the HVAC controller(s) 18 so that the HVAC controller(s) 18 may send and/or receive data and/or commands to and/or from the wireless devices.

In some instances, such as when a wireless device (e.g. wireless sensor 240) is being added to an HVAC system 4 having an existing HVAC controller 18, a communication link between the wireless sensor 240 and the HVAC controller 18 may be established by selecting a connect button 252 provided on the wireless sensor 240. Selection of the connect button 252 may cause the wireless sensor 240 to send a signal to the existing HVAC controller 18, commanding the HVAC controller 18 to recognize and enroll the wireless sensor 240 as part of the HVAC system 4, and establish a communication link between the wireless sensor 240 and the HVAC controller 18. In some cases, when the connect button 252 on the wireless device 240 is activated and the wireless device 240 is enrolled with the HVAC controller 18, the newly enrolled wireless device 240 may be identified on the display 62 of the HVAC controller 18. This feature may provide visual confirmation to the installer that the wireless device (e.g. wireless sensor 240) has been successfully enrolled with the HVAC controller 18.

In other instances, such as when the one or more wireless devices 240, 242, 244, 246, 428, and/or 250 are installed at the same time as the HVAC controller 18, the HVAC controller may display one or more screens on the display 62 of the user interface 48 that may guide a user through establishing a communication link between the HVAC controller 18 and the one or more wireless devices. Again, the communication link may be a one-way or a two-way communication link. FIGS. 5-12 show several illustrative screens that may be displayed on the display 62 of an exemplary HVAC controller 18 during set-up of the HVAC controller 18 with one or more wireless devices such as, for example, wireless indoor air sensor 240.

Figure 5:
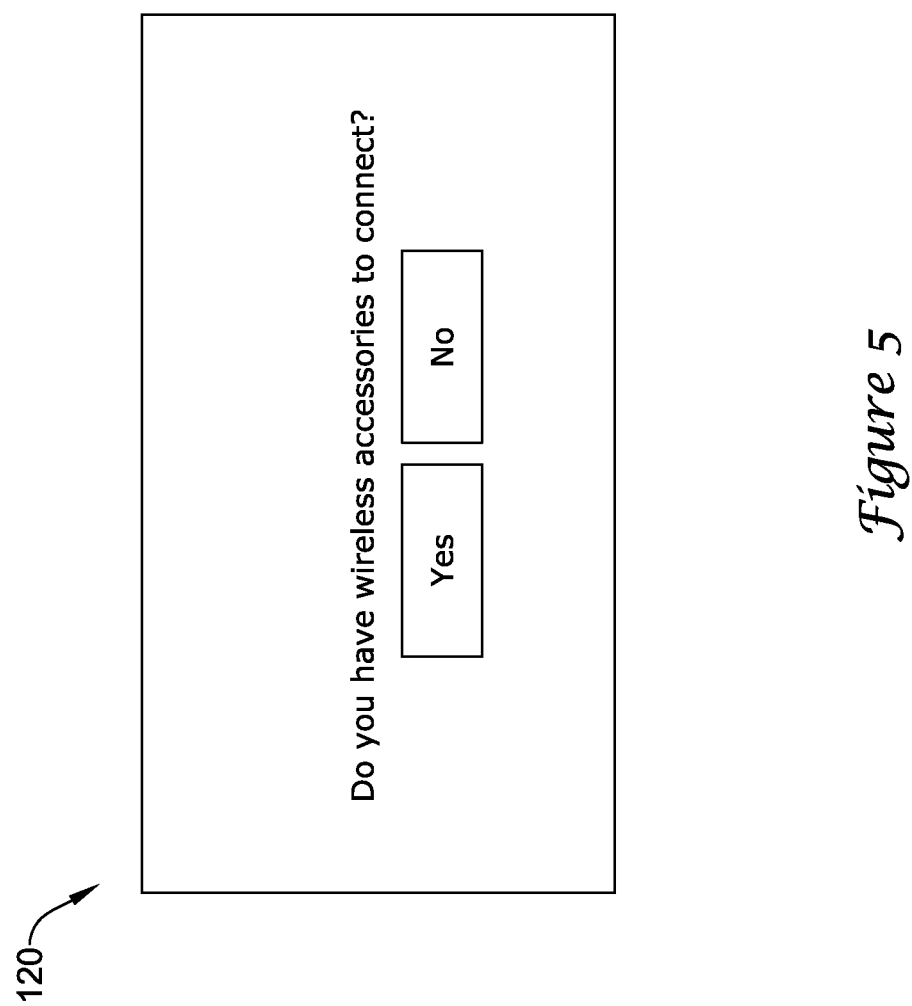
FIGS. 5-15 show several illustrative screens that may be displayed on the display of the HVAC controllers of FIGS. 2 and 3 when in use.
Figure 6:
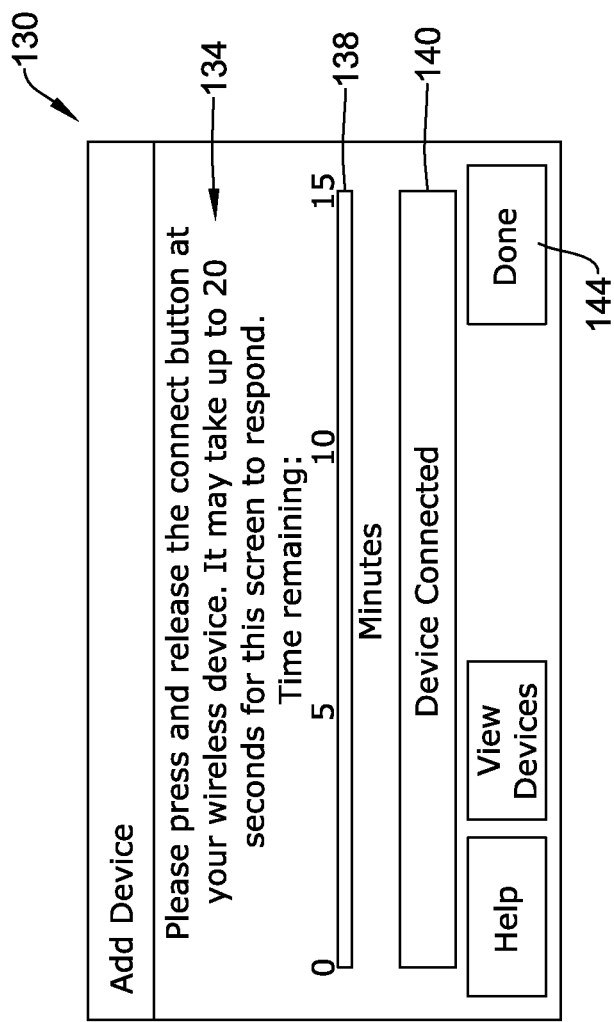

In some cases, during the initial set-up of the HVAC controller 18, the HVAC controller 18 may display a user query screen 120, as shown in FIG. 5, that queries the user about any wireless devices such as, for example, wireless sensor 240 that may need to be connected to the HVAC controller 18 as a part of the controller set-up process. User query screen 120 may include one or more options for responding to the user query presented on the user query screen 120. For example, as shown, user query screen 120 may include a first option 124 labeled "Yes" and second option 126 labeled "No." Selection of the first option 124 labeled "Yes" may cause the HVAC controller 18 to subsequently display a connection prompt screen 130, as shown in FIG. 6, which may prompt the user to take a certain action to facilitate connection of a selected wireless device (e.g. wireless sensor 240) with the HVAC controller 18.

Figure 13:
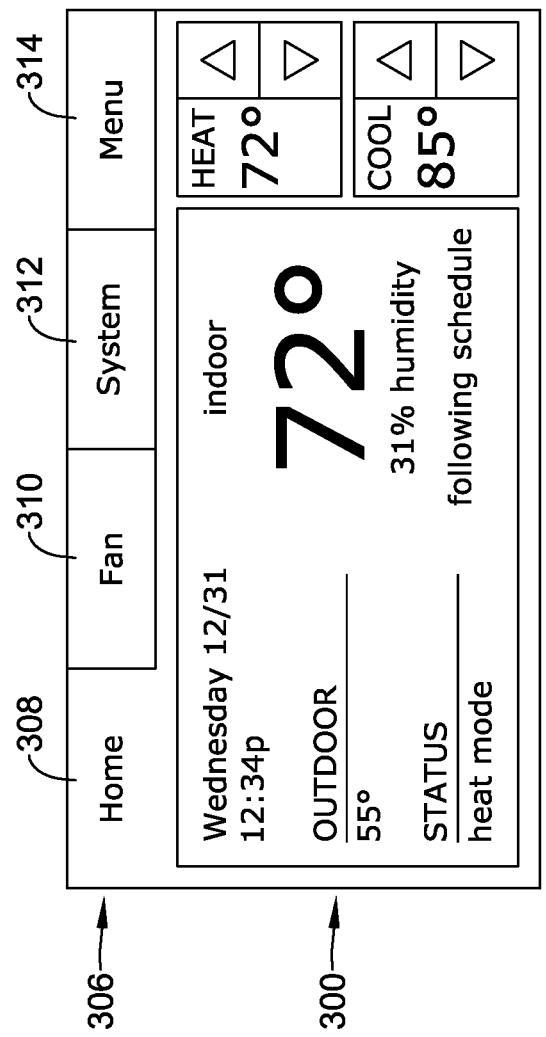

In some cases, connection prompt screen 130 may include a first user message 134 that instructs to the user to press and release a connect button (e.g. connect button 252 shown in FIG. 4) of the wireless device (e.g. wireless sensor 240). Additional information that may be useful to the user may be optionally included within the first user message 134. In some cases, connection prompt screen 130 may also include a status bar 138 that may display the amount of time that has lapsed since connection between the HVAC controller 18 and the wireless device (e.g. wireless sensor 240) was attempted but, this is not required. Upon successful connection of the HVAC controller 18 with the wireless device (e.g. wireless sensor 240), the HVAC controller 18 may display a second user message 140 on the connection prompt screen 130 indicating that a new device has been enrolled and added. When provided, the second user message 140 may be displayed on another subsequent screen or a pop-up screen, but this is not required. In some cases, selection of the button 144 labeled "Done" or "Finished" may cause the HVAC controller 18 to display additional screens related to setting up the HVAC controller 18, but this is not required. In other cases, selection of the "Done" button 144 may cause the HVAC controller 18 to display a home screen such as shown in FIG. 13, discussed in greater detail below. It will be understood that a similar set of screens may be displayed for any wired accessories needing connection to the HVAC controller 18, if desired.

Figure 7:
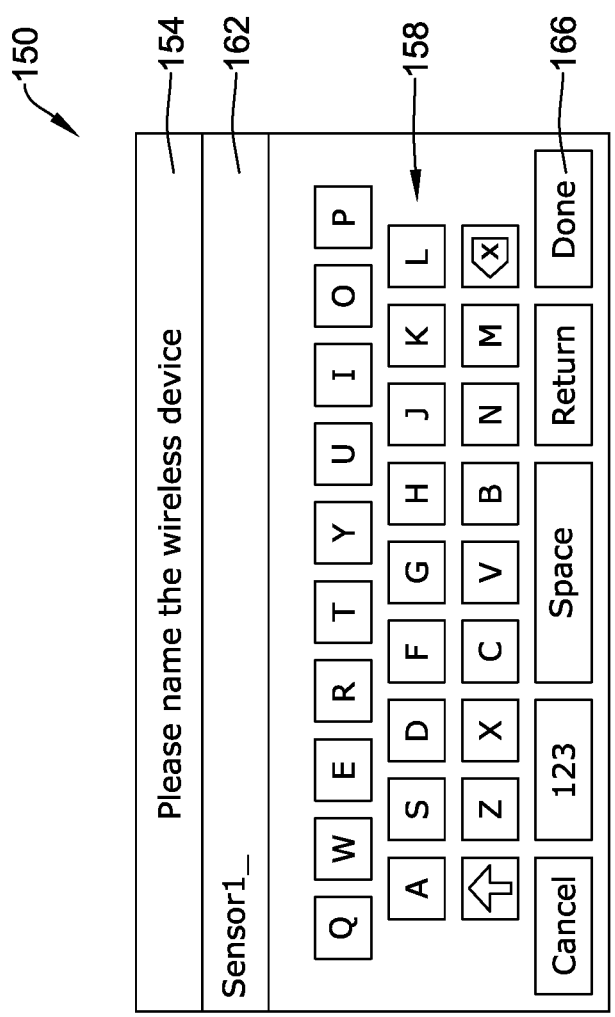

In some cases, upon successful connection of the HVAC controller 18 with the wireless device (e.g. wireless sensor 240), the HVAC controller 18 may display a first user prompt screen 150 that may prompt the user to name the wireless device that was just connected (see FIG. 7). In some cases, screen 150 may include a user message 154 which may prompt the user to name the wireless device. Screen 150 may also include a keyboard 158 that may be used by the user to enter a name for the device. In some cases, the keyboard 158 may be a virtual keyboard. In other cases, the keyboard 158 may be a physical keyboard and may include hard buttons to facilitate entry of the device name. The device name may be displayed in a name display region 162 positioned above or below the keyboard 158. In some cases, the device name may be displayed in the name display region 162 as the user is entering the name of the device using keyboard 158. Selection of button 166 labeled "ENTER" or "DONE" may cause the HVAC controller 18 to accept the device name entered by the user in name display region 162, and to assign this name to the wireless device.

Figure 8:
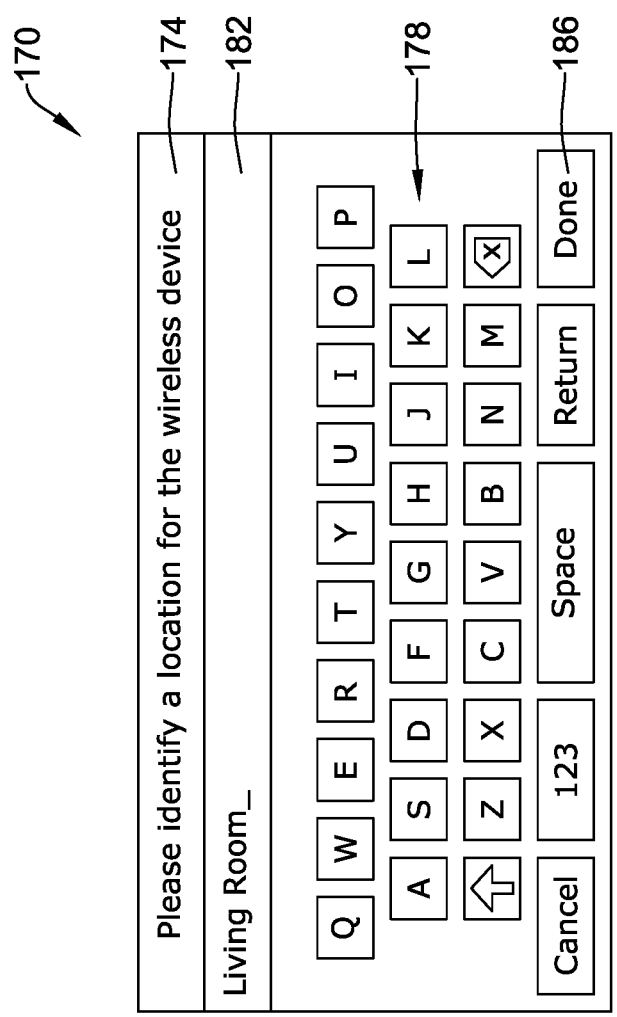

Selection of the "DONE" button 166 may also cause the HVAC controller 18 to display a second user prompt screen 170 that may prompt the user to identify the location of the wireless device (see FIG. 8). In some cases, screen 170 may include a user message 174 which may prompt the user to identify the location of the wireless device. Screen 170 may also include a keyboard 178 that may be used by the user to enter the location associated with the wireless device. In some cases, the keyboard 178 may be a virtual keyboard. In other cases, the keyboard 178 may be a physical keyboard including hard buttons. The device location may be displayed in a location identification region 182 positioned above or below the keyboard 178. In some cases, the identified location may be displayed in the location identification region 182 as the user identifies the location of the wireless device using the keyboard 178. Selection of button 186 labeled "ENTER" or "DONE" may cause the HVAC controller 18 to accept the identified location entered by the user and to associate the location with the wireless device. For example, through screen 150 a user may name a wireless indoor air temperature sensor 40 "Sensor 1" and through screen 170, the user may identify the location of "Sensor 1" as the "Living Room." The HVAC controller 18 may then store the name of the wireless device and its location in the controller memory.

Figure 9:
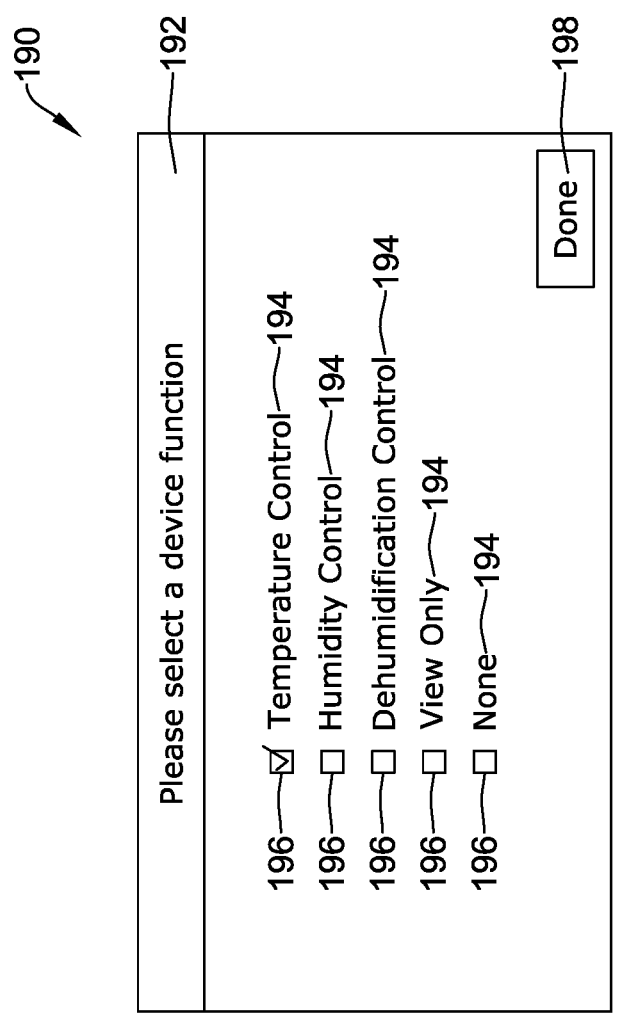

Selection of button 186 may cause the HVAC controller 18 to display a third user prompt screen 190 that may prompt the user to identify a function associated with the connected wireless device (see FIG. 9). In some cases, screen 190 may include a user prompt 192 that may prompt the user to select a device function. In some cases, screen 190 may provide a list of individually selectable device functions 194 for the user's selection. Exemplary device functions include, but are not limited to, temperature control, humidification control, dehumidification control, view only, read only, and none of the above. The "View Only" device function 194 may be selected in certain cases where, for example, the wireless device is a temperature or a humidity sensor, but its temperature or humidity reading is not to be used to control the operation of the HVAC system 4. The option labeled "None" may be used, for example, for non-sensor type devices. Selection indicator boxes 196 may be optionally displayed adjacent to each of the individually selectable device functions 194. The selection indicator boxes 196 may include a check mark, an "X", a dot, filled in, or include any other suitable selection indicator as desired. In some cases, more than one device function may be associated with a selected wireless device. Selection of the button 198 labeled "OK" or "DONE" may cause the HVAC controller 18 accept the selection and associate one or more device functions with the connected wireless device.

Figure 10:
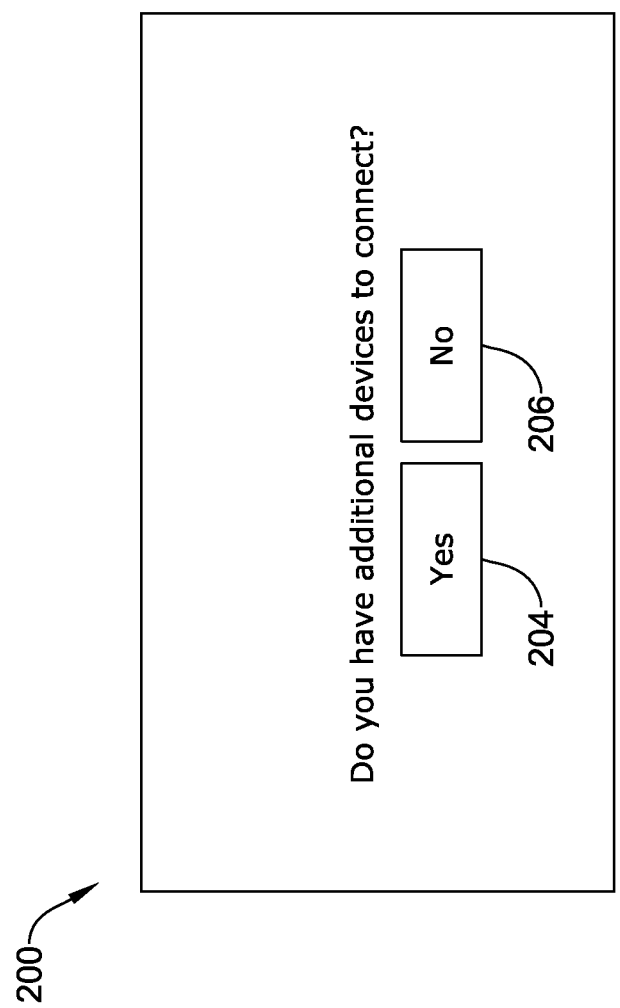

Selection of the "Done" button 198 may cause the HVAC controller 18 to display a user query screen 200, as shown in FIG. 10, which may query a user about additional devices to be connected. User query screen 200 may include one or more options for responding to the user query presented on the user query screen 200. For example, as shown, user query screen 200 may include a first option 204 labeled "Yes" and second option 206 labeled "No". Selection of the first option 204 labeled "Yes" may cause the HVAC controller 18 to subsequently display screens 130, 150, 170, and 190 as described above with reference to FIGS. 6-9, which may prompt the user to connect an additional device (screen 130 of FIG. 6), to name and identify the location of the additional wireless device (screens 150 and 170 of FIGS. 7 and 8), and/or to identify a device function of the additional wireless device (screen 190 of FIG. 9). The user may continue the steps outlined with reference to FIGS. 6-10 for connecting wireless devices to the HVAC controller 18 until all of the desired wireless devices are connected.

Figure 11:
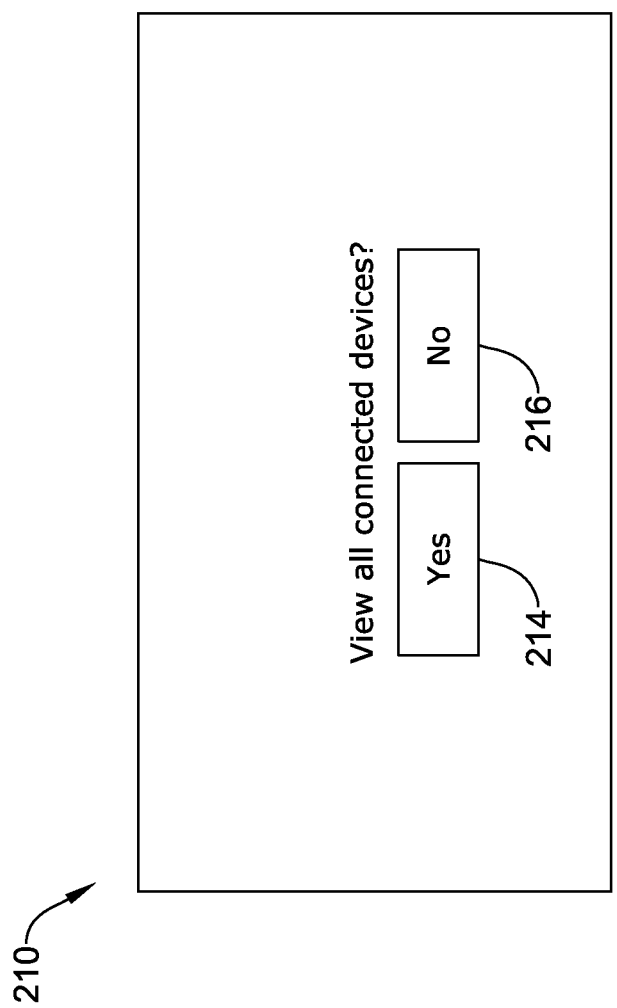
Figure 12:
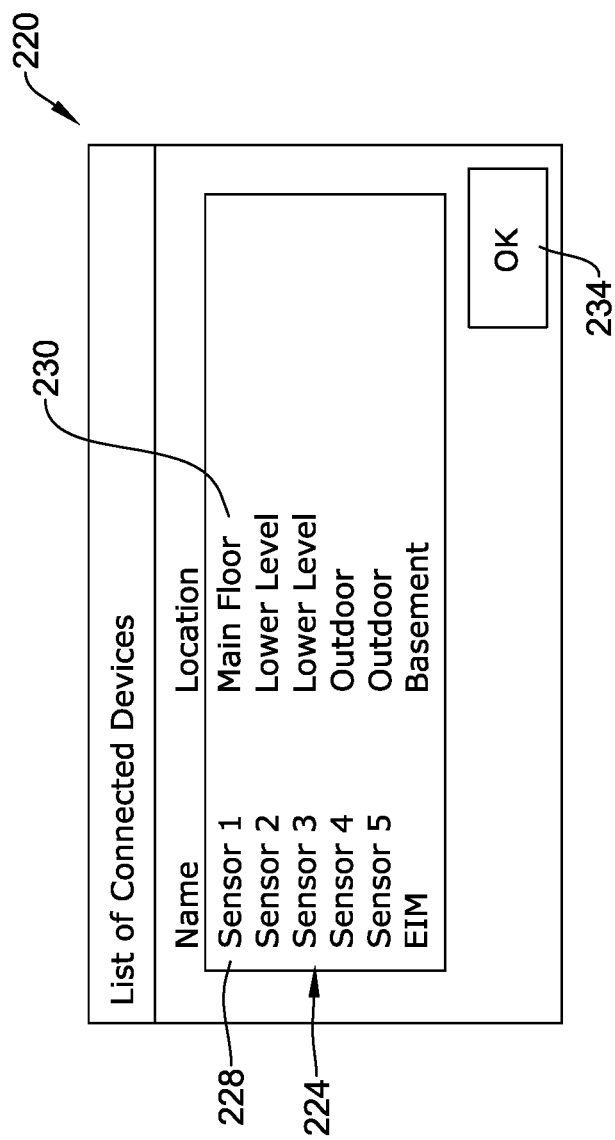

In the example shown, after connection of the last wireless device, the user may select the second option 206 labeled "No" in response to the user query presented on user query screen 200 of FIG. 10. In some cases, this may cause the HVAC controller 18 to display a subsequent user query screen 210, as shown in FIG. 11, which may query the user about viewing the connected devices. Again, user query screen 210 may include a first option 214 labeled "Yes" and a second option 216 labeled "No." Selection of the second option 216 labeled "No" may cause the HVAC controller 18 to display a home screen such as, for example, home screen 300 shown in FIG. 13. Selection of the first option 214 labeled "Yes" may cause the HVAC controller 18 to display a subsequent screen 220, as shown in FIG. 12, which provides a list 224 of the connected devices, and may include the device name 228 and the device location 230. In some cases, the list 224 may be presented in a table format. The table may be a scrolling table in which case, the screen 220 may also include a scroll bar or first and second arrows keys (not shown) for navigating the table. In some cases, each device name 228 may be individually selectable such that a user may select a device name to view more information about the selected device. For example, a user may select device name "Sensor1" to view the device function by simply touching "Sensor1". The additional information about the selected device may be displayed on separate screen, or a "pop-up" screen that may be overlaid on screen 220. In some cases, the device function may be displayed adjacent the device name 228 and the device location 230. The user may select the button 234 labeled "OK" or "DONE" when they are finished viewing the list of connected devices. Selection of the button 234 labeled "OK" or "DONE" may cause the HVAC controller to display a home screen such as, for example, home screen 300 shown in FIG. 13.

Naming and identifying the location of each of the wireless devices connected to the HVAC controller 18 may be useful under many circumstances. For example, in some circumstances, it may be useful to identify if the HVAC controller 18 is controlling the system according to temperature and/or humidity levels sensed by the HVAC controller 18 itself and/or according to temperature and/or humidity levels sensed by one or more sensors located at one or more remote locations. This information may be displayed on the display 62 of the HVAC controller 18. In some cases, the information may be displayed as a brief informational statement on the display 62 adjacent the current temperature and/or humidity level reading. The brief information statement may indicate that the HVAC controller 18 is "sensing from this device," "sensing from remote location," "sensing using average sensor value," "sensing using weighted average sensor value," and the like. These are just some examples. If sensing from a single location, the informational statement may specify the location.

Another circumstance in which naming and identifying the location of each of the wireless devices connected to the HVAC controller 18 may be useful is when a battery condition in one of the devices becomes low. In some cases, at least one of the wireless devices, as described herein, may be configured to send a signal indicative of a low battery condition when battery level in the wireless device is low. The HVAC controller 18 may receive the signal indicative of a low battery condition from the wireless device and, in response, may display an alert on the display 62 of the HVAC controller 18, indicative of a low battery condition in the wireless device. The alert displayed on the display 62 of the HVAC controller 18 may identify the name of the wireless device having the low battery condition. In some cases, the alert may include the device name and/or the device location. This may make it easier for a user to identify and locate the particularly wireless device having the low battery condition for battery replacement. In some cases, the wireless device may be further configured to activate an alert on the wireless device itself that is indicative of the low battery condition. The alert that is activated on the wireless device itself may include, for example, a flashing or blinking light such as a light emitting diode (LED), which may be visible to the user. In other cases, the alert may include an intermittent beep or other audible sound that may indicate to the user that battery level in the wireless device is low. These are just some examples.

In some cases, at least one of the wireless devices, as described herein, may be configured to detect a first low battery condition and to send a first signal indicative of the first low battery condition to the HVAC controller 18. In addition, the at least one wireless device may be configured to detect a second low battery condition after further battery depletion, and to send a second signal indicative of the second low battery condition to the HVAC controller. In response to the detection of a second low battery condition, the wireless device may activate an alert on the wireless device itself that is indicative of the second low battery condition. The alert may be a visual or audible alert, as described above. The HVAC controller 18 may also display an alert on the display 62 of the HVAC Controller 18. In some cases, the alert displayed on the display 62 of the HVAC controller 18 in response to the second low battery condition may be more urgent and/or noticeable than the alert displayed in response to the first low battery condition.

Also, and to conserve battery power, it is contemplated that the wireless device may not provide any alert (e.g. flashing light or audible alarm) in response to the first low battery condition, but may provide an alert in response to the second low battery condition.

FIG. 13 provides an example of a home screen 300 that may be displayed by an HVAC controller 18 on its display 62 when no data entry is underway for a period of time, when a user selects a home screen button or, in some cases, after the user has finished adding one or more wireless devices to the HVAC system 4, as described above with reference to FIGS. 5-10. The illustrative home screen 300 of FIG. 13 may include a navigational bar 306 along the top. Navigational bar 306 may be considered as providing top level navigation. In some cases, if desired, navigational bar 306 may include one or more of a HOME button 308, a FAN button 310, a SYSTEM button 312 and/or a MENU button 314. In the example shown, the user may access one or more menus from which the user may make a temperature set point change, a humidity set point change, an indoor air quality change, a programmable schedule change, a system mode change, a fan setting change, an installer set-up change, an exit/entry remote setting change, among others.

Figure 14:
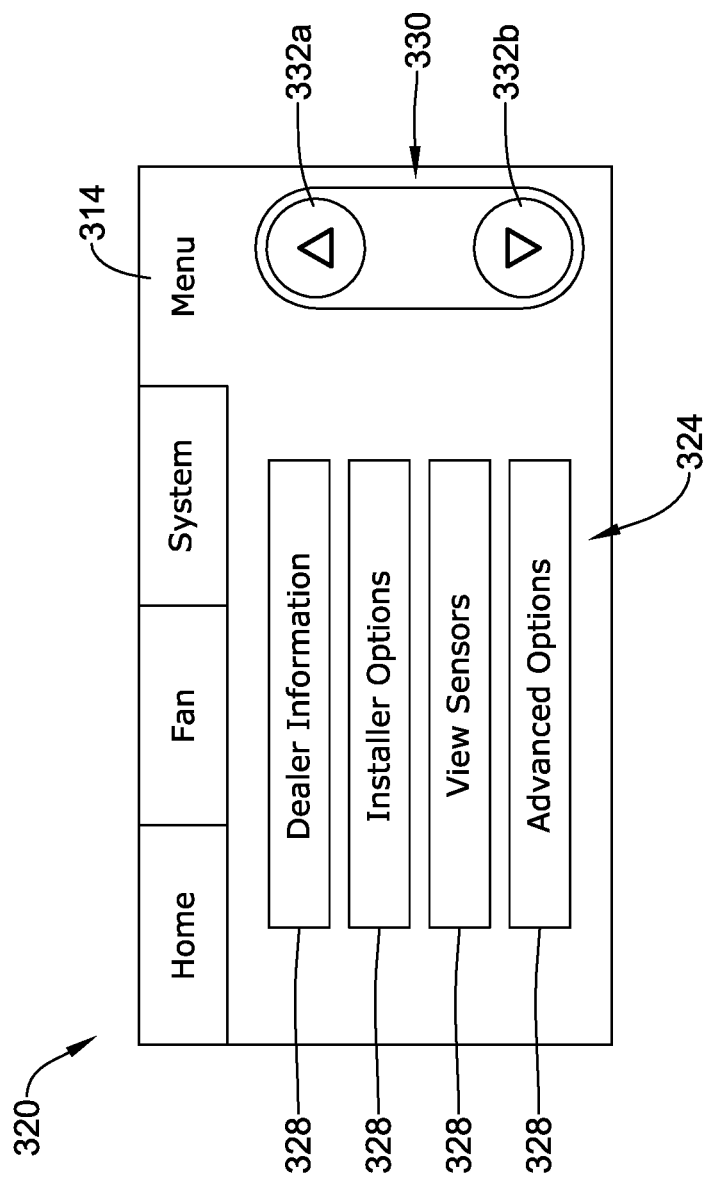
Figure 15:
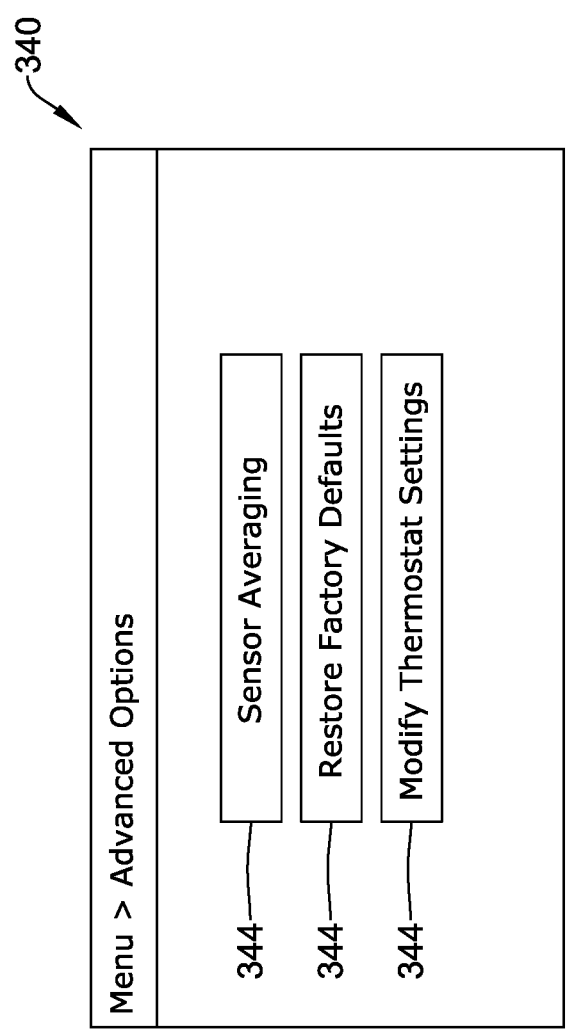

FIG. 14 shows an example of a menu screen 320 that may be displayed when a user selects the MENU button 314 on home screen 300 of FIG. 13. The illustrative menu screen 320 may include a table 324 that includes one or more individually selectable menu options 328 that may be selected by the user. In some cases, the table 324 may be a scrolling table, in which case the menu screen 320 may also include a scroll bar 330 including first and second arrows 332a, 322b that may facilitate a user in scrolling through the available menu options 328. In some cases, a menu option 328 labeled "Advanced Options" may be provided. Selection of the menu option 328 labeled "Advanced Options" may cause the HVAC controller 18 to display an Advanced Options menu screen 340, as shown in FIG. 15. The Advanced Options menu screen 340 may list one or more individually selectable installer options available for selection by the user, including an option 344 labeled "Sensor Averaging." Selection of the "Sensor Averaging" option 344 may cause the HVAC controller 18 to display a sequence of one or more screens which may allow a user to select which sensors participate in sensor averaging for operation and control of the HVAC system 4. The sensors that may be available for sensor averaging may include, but are not limited to, any external wired or wireless sensor and the HVAC controller's own internal sensor(s). The averaged sensor value may be used for temperature control, humidification control, dehumidification control, and/or any other suitable control.

FIGS. 16A-18 show several illustrative screens for selecting one or more sensors to participate in sensor averaging for operation and control of the HVAC system 4. The sensor average may be calculated by dividing the sum of the individual sensor values by the number of selected sensors. In some cases, weights may be used to weight the sensor values. For example, the sensor value sensed by the sensor in the HVAC controller 18 may be weighted higher than a sensor value sensed by a remotely located sensor.

Figure 16A:
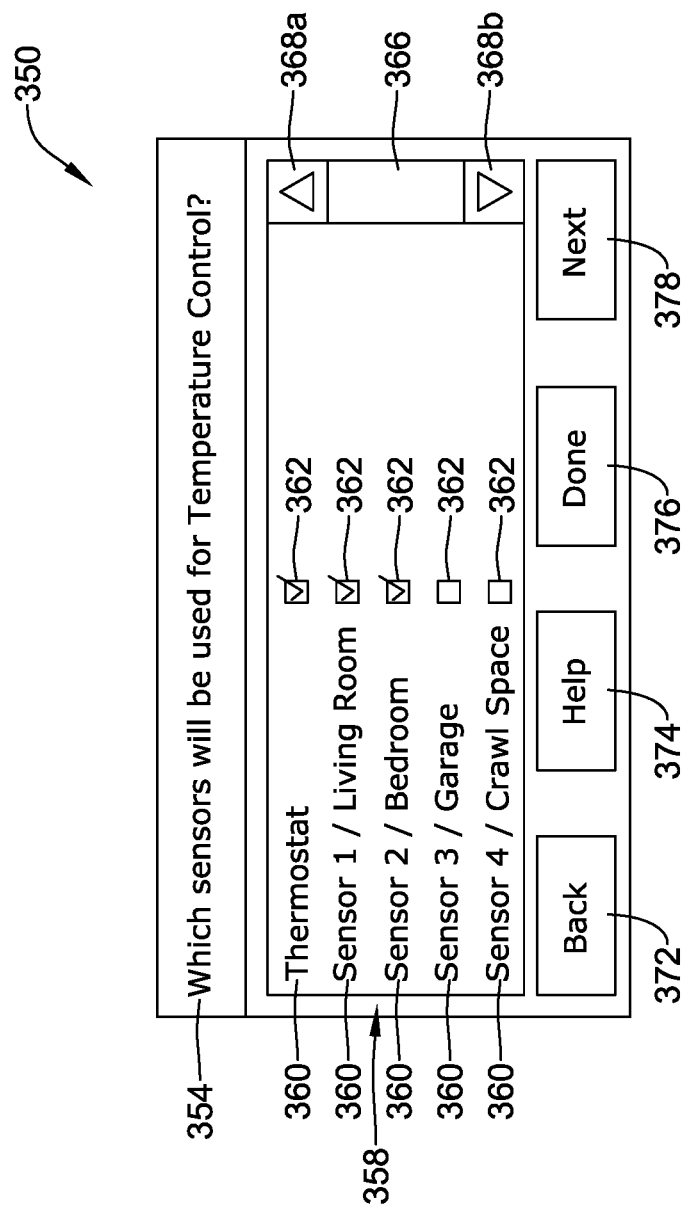
FIGS. 16A-18 show several illustrative screens that may be displayed on the display of the HVAC controllers of FIGS. 2 and 3 for selecting one or more sensors to participate in sensor averaging for operation and control of an HVAC system.
Figure 16B:
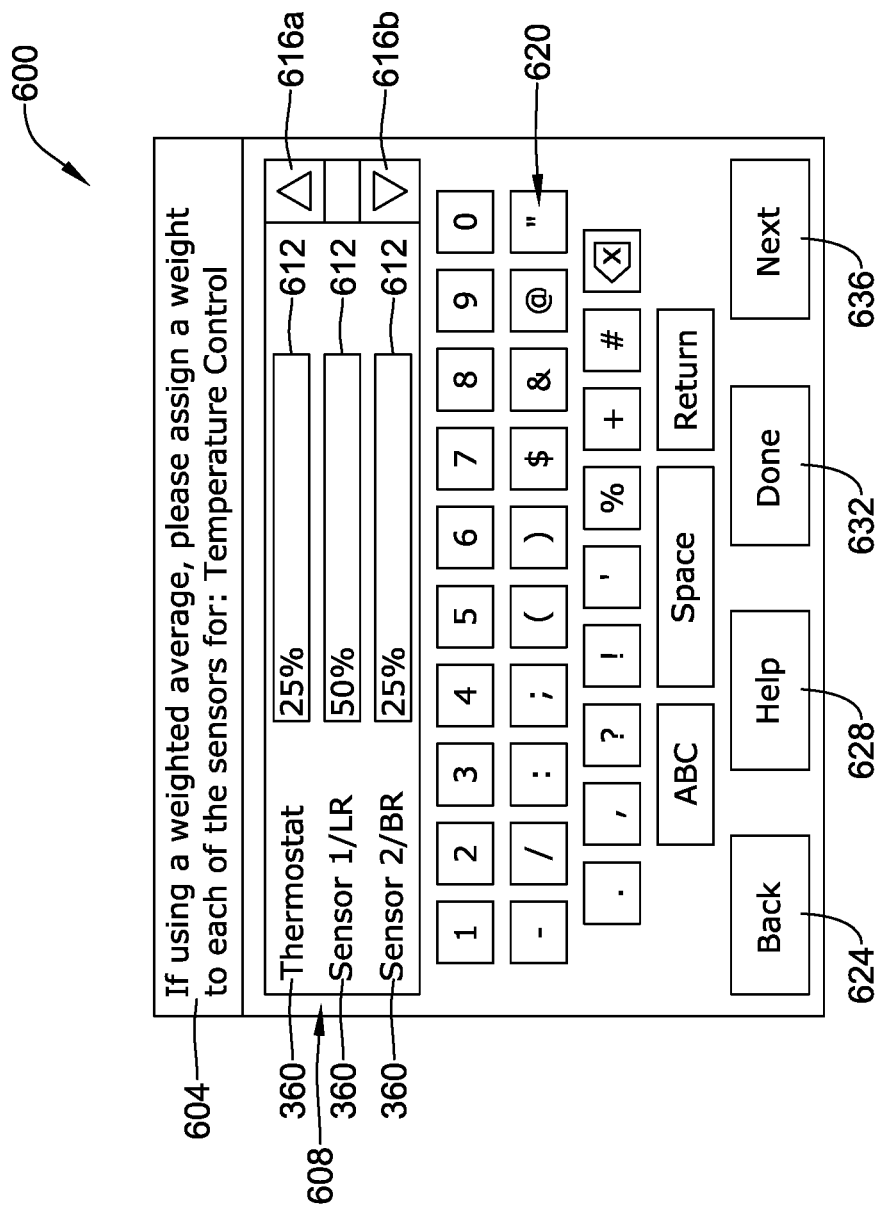
Figure 17A:
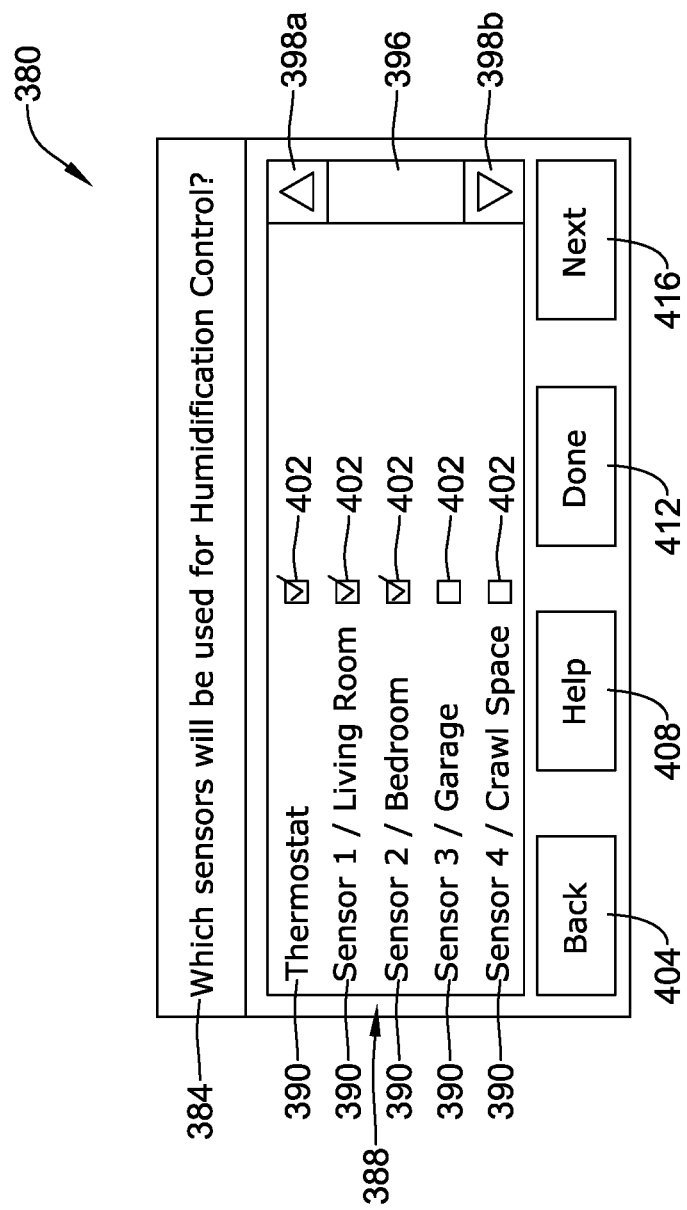
Figure 17B:
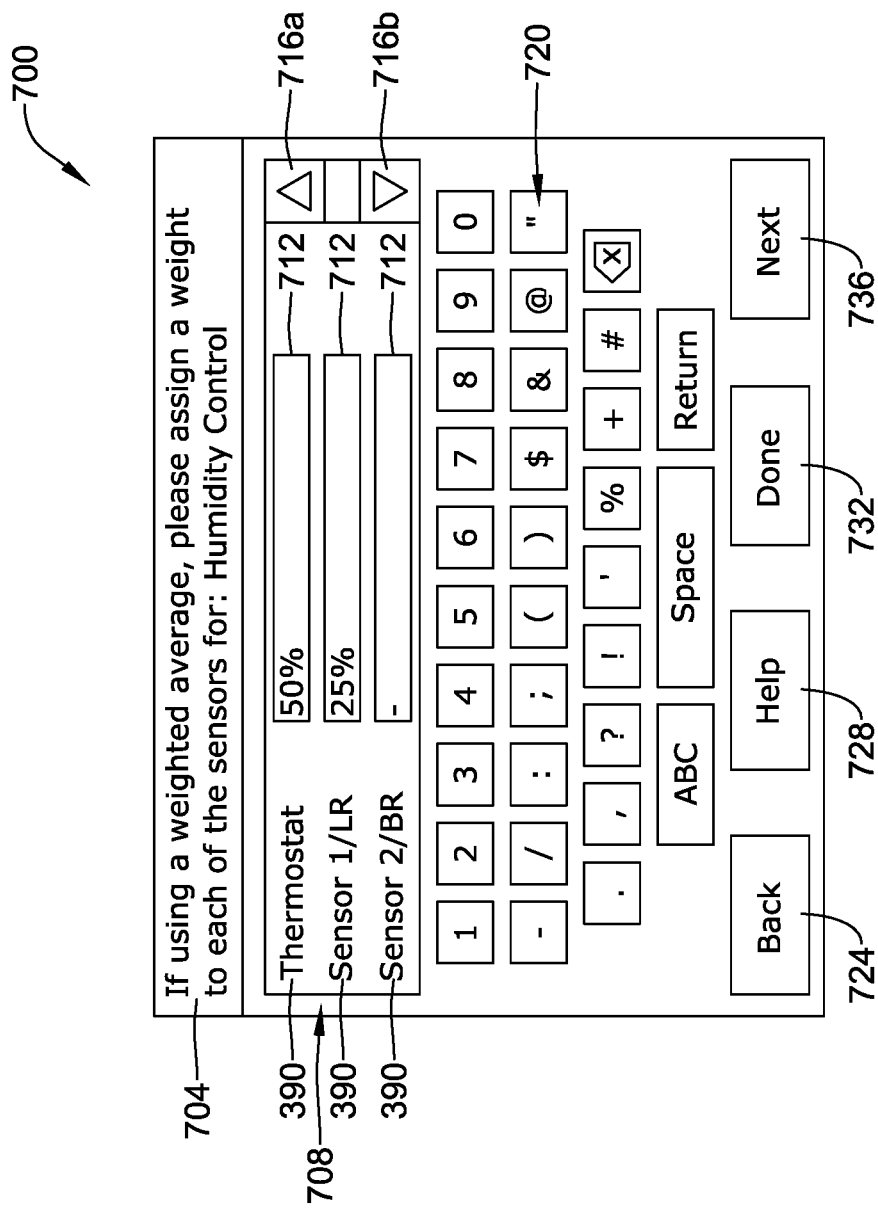
Figure 18:
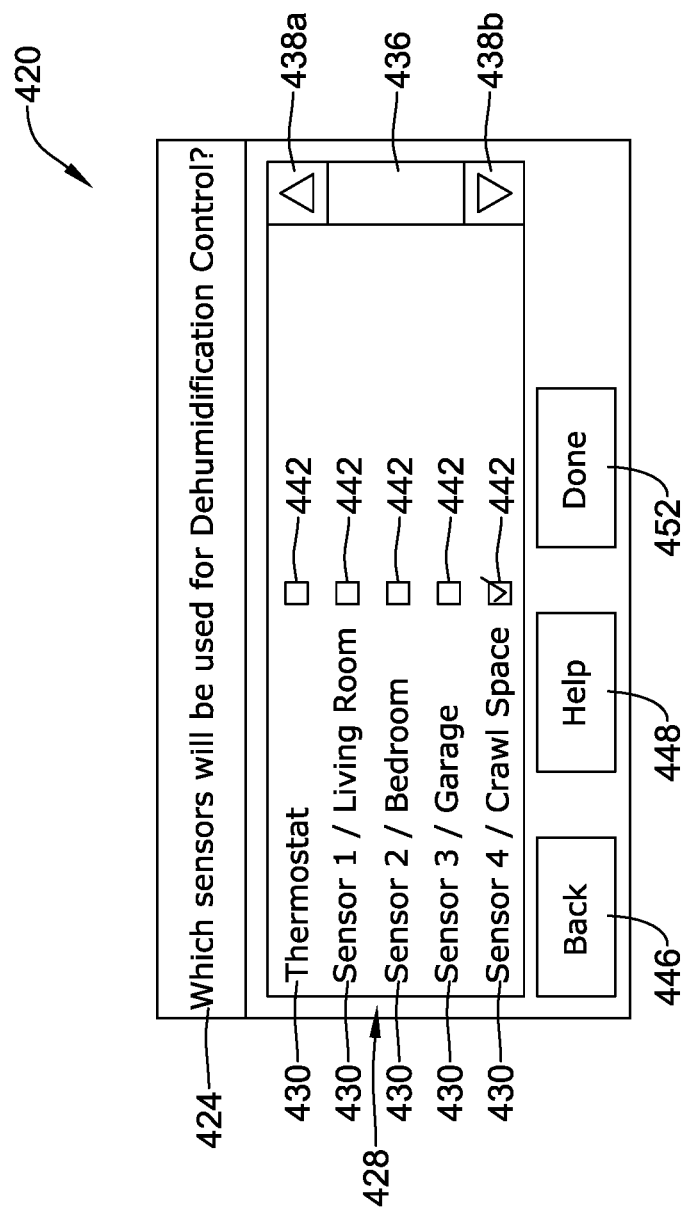

FIG. 16A shows an illustrative screen 350 for selecting which sensor(s) are to be used for temperature control of the HVAC system 4, and FIG. 16B shows an illustrative screen 600 for assigning a weight to each of the selected sensor(s) if using a weighted sensor average for temperature control. Similarly, FIG. 17A shows an illustrative screen 380 for selecting which sensor(s) are to be used for humidification control, and FIG. 17B shows an illustrative screen 700 for assigning a weight to each of the selected sensor(s) if using a weighted sensor average for humidification control. FIG. 18 shows an illustrative screen 420 for selecting which sensor(s) are to be used for dehumidification control of the HVAC system. In some cases, all of the available sensors may be selected by default for temperature control, humidification control, and/or dehumidification control of the HVAC system 4, as applicable. In other cases, only the internal sensor(s) of the HVAC controller 18 may be selected by default for temperature control, humidification control, and/or dehumidification control of the HVAC system 4, as applicable. When more than one sensor is selected for any one of temperature control, humidification control, or dehumidification, the HVAC controller 18 may be configured to average the values sensed by the selected sensors and to use the average to control the desired parameter (e.g. temperature, humidification, or dehumidification).

Sensor selection screen 350, as shown in FIG. 16A, may include a user prompt 354 that prompts the user to select which sensor(s) are to be used for temperature control. Screen 350 may also include a list 358 of the sensors 360 available for selection. In the example shown, each of the available sensors 360 may be identified by their name and/or their location. In some cases, only the location is used to identify each of the available sensors 360. The sensor name and/or location of each of the available sensors 360 may be assigned during connection of the sensors to the HVAC system 4 as described above with reference to FIGS. 5-10. Additionally, in some cases, only those sensors that have been previously identified as having a temperature control function are included in the list 358. For example, if a particular sensor has not been identified as having a temperature control function; it may not be included in the list 358. Similarly, if the sensor has been previously identified as "View Only" or "Read Only", it may not be included in the list 358 of available sensors. Each of the available sensors 360 included in list 358 may be individually selectable for use in sensor averaging, such that selection of one sensor does not affect selection of another sensor. Screen 350 may include a scroll bar 366 and/or first and second arrow keys 368a and 368b for navigating through the list 358 of sensors available for selection 360. In some cases, selection indicator boxes 362 may be provided adjacent to each of the sensors 360 available for selection included in the list 358. The selection indicator boxes 362 may include a check mark, an "X", a dot, or be filled in to indicate selection. In the example shown, the user may deselect a previous selection by simply touching the selection indicator box 362. In some cases, all of the sensors will be selected by default in which case, a user may need to deselect those sensors that they do not wish to contribute to the temperature control.

Sensor selection screen 350 may also include a "BACK" button 372 that, when selected, may cause HVAC controller 18 to display the previous screen. Additionally, sensor selection screen 350 may include a button 374 labeled "HELP" that, when selected, may cause HVAC controller 18 to display additional information about the current screen that may be useful to a user. Selection of button 376 labeled "DONE" may cause the HVAC controller 18 to accept the sensor selection(s), and to display a home screen such as home screen 300 of FIG. 13. Selection of button 378 labeled "NEXT" may cause the HVAC controller 18 to display a sensor averaging screen 600, as shown in FIG. 16B, for assigning a weight to each sensor used to produce a weighted sensor average, if applicable.

Sensor averaging screen 600, as shown in FIG. 16B, may include a user prompt 604 that prompts the user to assign a weight to each of the sensor(s) previously selected for use in temperature control. Screen 600 may display a list 608 of those sensor(s) 360 previously selected for use in temperature control through sensor selection screen 350 as shown in FIG. 16A. In the example shown, each of the selected sensors 360 may be identified by their name and/or their location. In some cases, only the location is used to identify each of the selected sensors 360. A text entry box 612 for assigning a weight to a selected sensor 360 may be displayed adjacent to each of the selected sensors 360 displayed in the 608. Screen 600 may include first and second arrow keys 616a and 616b for navigating through each of the text entry boxes 612 associated with each of the selected sensors 360. Additionally, screen 600 may include a keyboard 620 that may be used by the user to enter the weight assigned to each of the selected sensors 360. In some cases, the keyboard 620 may be a virtual keyboard. In other cases, the keyboard 620 may be a physical keyboard including hard buttons. In some cases, each of the sensors 360 displayed in list 608 will be assigned an equal weight by default.

Sensor selection screen 600 may also include a "BACK" button 624 that, when selected, may cause HVAC controller 18 to display the previous screen. Additionally, sensor selection screen 600 may include a button 628 labeled "HELP" that, when selected, may cause HVAC controller 18 to display additional information about the current screen that may be useful to a user. Selection of button 632 labeled "DONE" may cause the HVAC controller 18 to accept the assigned weights, and to display a home screen such as home screen 300 of FIG. 13. Selection of button 636 labeled "NEXT" may cause the HVAC controller 18 to display another sensor selection screen 380, as shown in FIG. 17A, for selecting which sensors will be used for humidification control, as applicable.

Sensor selection screen 380, as shown in FIG. 17A, may include a user prompt 384 that prompts the user to select which sensor(s) are to be used for humidification control. Screen 380 may also include a list 388 of the sensors 390 available for selection. Each of the available sensors 390 may be identified by their name and/or their location. In some cases, only the location is used to identify each of the available sensors. The sensor name and/or location of each of the available sensors may be assigned during connection of the sensors to the HVAC system 4, as was described above with reference to FIGS. 5-10. In some cases, only those sensors 390 that have been previously identified as having a humidification control function are included in the list 388.

For example, if a particular sensor has not been identified as having a humidification control function; it may not be included in the list 388. Each of the available sensors 390 included in list 388 may be individually selectable for use in sensor averaging such that selection of one sensor does not affect selection of another sensor. Screen 380 may include a scroll bar 396 and/or first and second arrow keys 398a and 398b for navigating through the list 388 of sensors available for selection 390. In some cases, selection indicator boxes 402 may be provided adjacent to each of the sensors 390 available for selection included in the list 388. The selection indicator boxes 402 may include a check mark, an "X", a dot, or be filled in to indicate selection.

In the example shown, the user may deselect a previous selection by simply touching the selection indicator box 402. In some cases, all of the sensors will be selected by default in which case, a user may need to deselect those sensors that they do not wish to contribute to the temperature control.

Sensor selection screen 380 may also include a "BACK" button 404 that, when selected, may cause HVAC controller 18 to display the previous screen. Additionally, sensor selection screen 380 may include a button 408 labeled "HELP" that, when selected, may cause HVAC controller 18 to display additional information about the current screen that may be helpful to a useful to a user. Selection of button 412 labeled "DONE" may cause the HVAC controller 18 to accept the sensor selections and to display a home screen such as home screen 300 of FIG. 13. Selection of button 416 labeled "NEXT" may cause the HVAC controller 18 to display a sensor averaging screen 700, as shown in FIG. 17B, for assigning a weight to each of the selected sensors for a weighted sensor average, if applicable.

Sensor averaging screen 700, as shown in FIG. 17B, may include a user prompt 704 that prompts the user to assign a weight to each of the sensor(s) previously selected for use in humidity control. Screen 700 may display a list 708 of those sensor(s) 390 previously selected for use in humidity control through sensor selection screen 380 as shown in FIG. 17A. In the example shown, each of the selected sensors 390 may be identified by their name and/or their location. In some cases, only the location is used to identify each of the selected sensors 390. A text entry box 712 for assigning a weight to a selected sensor 390 may be displayed adjacent to each of the selected sensors 390 displayed in the 708. Screen 700 may include first and second arrow keys 716a and 716b for navigating through each of the text entry boxes 712 associated with each of the selected sensors 390. Additionally, screen 700 may include a keyboard 720 that may be used by the user to enter the weight assigned to each of the selected sensors 390. In some cases, the keyboard 720 may be a virtual keyboard. In other cases, the keyboard 720 may be a physical keyboard including hard buttons. In some cases, each of the sensors 390 displayed in list 708 will be assigned an equal weight by default.

Sensor selection screen 700 may also include a "BACK" button 724 that, when selected, may cause HVAC controller 18 to display the previous screen. Additionally, sensor selection screen 700 may include a button 728 labeled "HELP" that, when selected, may cause HVAC controller 18 to display additional information about the current screen that may be useful to a user. Selection of button 732 labeled "DONE" may cause the HVAC controller 18 to accept the assigned weights, and to display a home screen such as home screen 300 of FIG. 13. Selection of button 737 labeled "NEXT" may cause the HVAC controller 18 to display another sensor selection screen 420, as shown in FIG. 18, for selecting which sensors will be used for dehumidification control.

Sensor selection screen 420, as shown in FIG. 18, may include a user prompt 424 that prompts the user to select which sensor(s) are to be used for dehumidification control. Sensor selection screen 420 may also include a list 428 of the sensors 430 available for selection. Each of the available sensors 430 may be identified by their name and/or their location. In some cases, only the location is used to identify each of the available sensors 430. The sensor name and/or location of each of the available sensors 430 may be assigned during connection of the sensors to the HVAC system 4, as was described above with reference to FIGS. 5-10. Additionally, in some cases, only those sensors that have been previously identified as having a dehumidification control function may be included in the list 428. For example, if a particular sensor has not been identified as having a dehumidification control function; it may not be included in the list 358. Similarly, if the sensor has been previously identified as "View Only" or "Read Only", it may not be included in the list 428 of available sensors for dehumidification control. Each of the available sensors 430 included in list 428 may be individually selectable for use in sensor averaging such that selection of one sensor does not affect selection of another sensor. Screen 420 may include a scroll bar 436 and/or first and second arrow keys 438aa and 438b for navigating through the list 428 of sensors available for selection 430. In some cases, selection indicator boxes 442 may be provided adjacent to each of the sensors 430 available for selection included in the list 428. The selection indicator boxes 442 may include a check mark, an "X", a dot, or be filled in to indicate selection. The user may deselect a previous selection by simply touching the selection indicator box 442. In some cases, none of the available sensors 430 may be selected by default in which case, a user may need to select those sensors which the HVAC controller 18 may user for dehumidification control.

Sensor selection screen 420 may also include a "BACK" button 446 that, when selected, may cause HVAC controller 18 to display the previous screen. Additionally, sensor selection screen 420 may also include a button 448 labeled "HELP" that, when selected, may cause HVAC controller 18 to display additional information about the current screen that may be helpful to a useful to a user. Selection of button 452 labeled "DONE" may cause the HVAC controller 18 to accept the sensor selections and to display a home screen such as home screen 300 of FIG. 13. It will be understood that if multiple sensors are selected for use in dehumidification control, then HVAC controller 18 may display a sensor averaging screen for assigning a weight to each of the selected sensors as discussed above in reference to FIGS. 16B and 17B.

Figure 19:
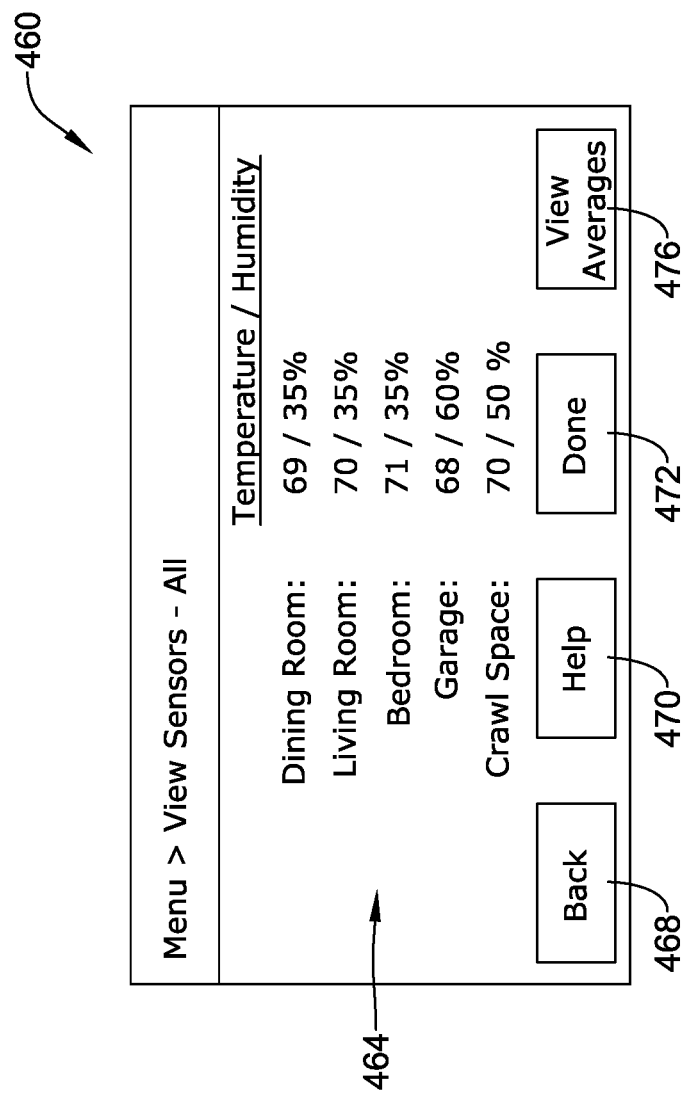
FIGS. 19 and 20A-20B show several illustrative screens that may be displayed on the display of the HVAC controllers of FIGS. 2 and 3 for viewing sensor data.

When the HVAC system 4 is in operation, a user may view the average sensor readings for temperature, humidification, and/or dehumidification control by, for example, selecting the menu option 328 labeled "View Sensors" provided on menu screen 320, as shown in FIG. 14. Selection of the menu option 328 labeled "View Sensors" may cause the HVAC controller 18 to display a sensor data summary screen 460, as shown in the example provided by FIG. 19, which may provide a table 464 listing the individual temperature and/or humidity readings for each of the identified sensors. Sensor data summary screen 460 may include a "BACK" button 468 that, when selected may cause the HVAC controller 18 to display the previous screen. Sensor data summary screen 460 may also include a "HELP" button 470 that, when selected, may cause the HVAC controller 18 to display additional information about the current screen 460 that may be useful to a user. Additionally, sensor data summary screen 460 may include a "DONE" button 472, that when selected, may cause the HVAC controller 18 to display menu screen 320 of FIG. 14 or, in some cases, a home screen such as, for example, home screen 300 of FIG. 13.

Figure 20A:
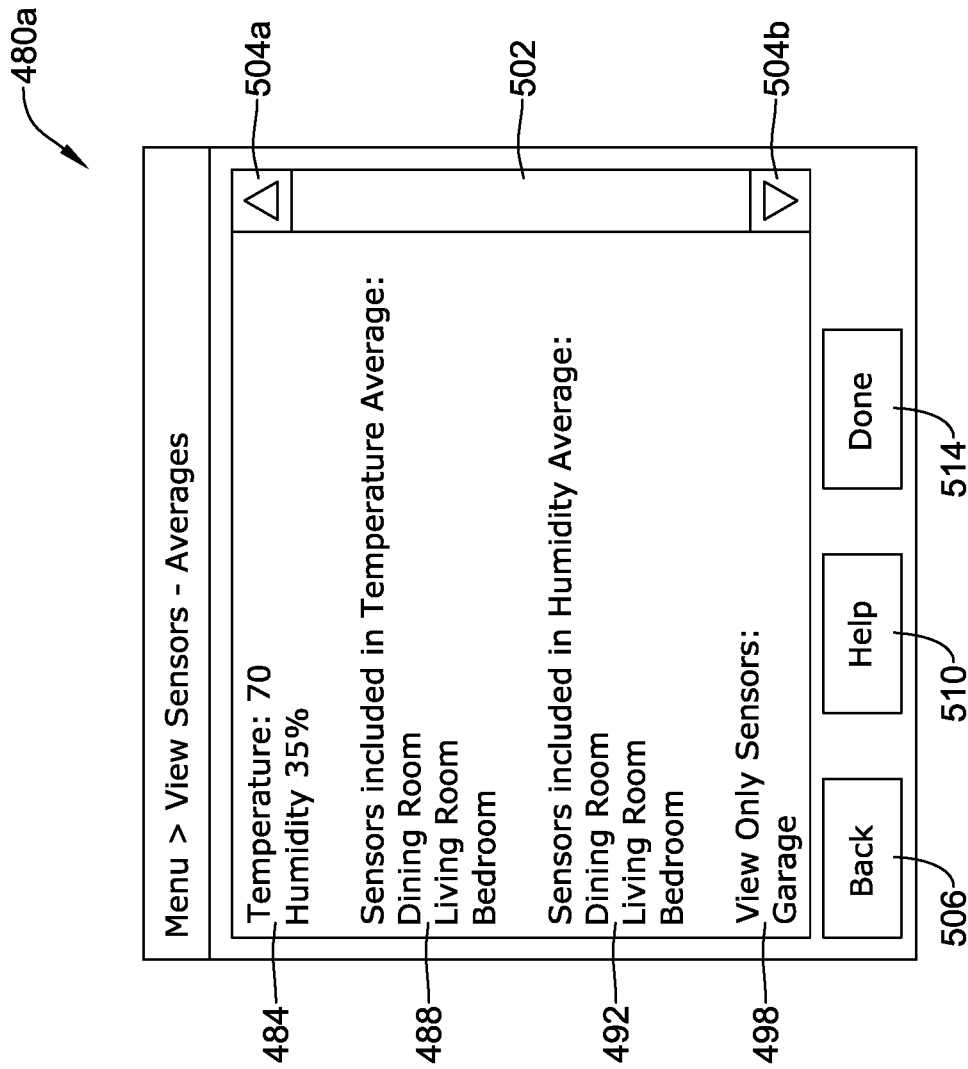
Figure 20B:
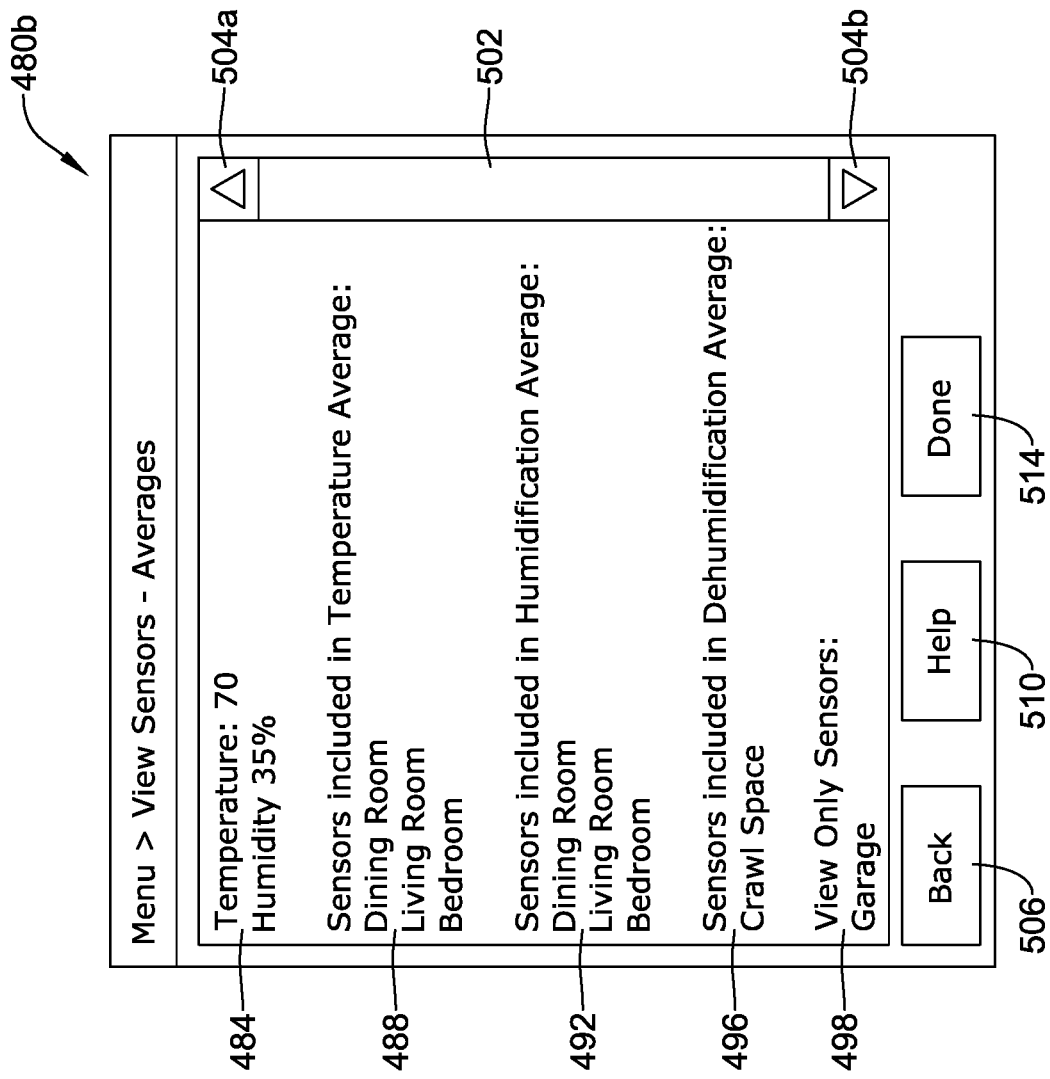

When sensors are averaged for temperature control, humidification control, and/or dehumidification control, a "View Averages" option 476 may also be provided on the sensor data summary screen 460. The "View Averages" option 476, when selected, may cause the HVAC controller 18 to display a sensor averages screen 480a or 480b as shown in FIGS. 20A and 20B. FIG. 20A shows a sensor averages screen 480a in which humidification and dehumidification are combined and presented as a single humidity reading. FIG. 20B shows a sensor averages screen 480b in which values related to humidification and dehumidification are separately displayed. As shown in FIGS. 20A and 20B, the sensor averages screens 480a, 480b may include a first region 484 in which the average temperature and the average humidity (humidification and/or dehumidification, as applicable) are provided. Sensor averages screens 480a, 480b may also include a second region 488 that may list the sensors used for temperature control, and that were used to calculate the reported temperature average. Sensor averages screens 480a, 480b may also include a third region 492, which may list the sensors used for humidification control, and which were used to calculate the reported average humidity. Sensor averages screen 480b may also include a fourth region 496, which may list the sensors used for dehumidification control, and which were used to calculate the reported average humidity related to dehumidification. Sensor averages screens 480a, 480b may also provide a list 498 of those sensors that were identified as "View Only" or "Read Only," and which were not used for temperature control, humidification control, and/or dehumidification control.

In some cases, the amount of data to be presented may be larger than can be accommodated in a single screen. As such, sensor averages screens 480a, 480b may include a scroll bar 502 including first and second arrow keys 504a, 504 for navigating through the data on the sensor averages screens 480, 480b. Additionally, sensor averages screens 480a, 480 may include a "BACK" button 506 that, when selected, may cause the HVAC controller 18 to display a previous screen. Sensor averages screens 480a, 480b may also include a "HELP" button 510 that, when selected, may cause the HVAC controller 18 to display additional information about the current screens that may be useful to a user. The "DONE" button 514, when selected, may cause the HVAC controller 18 display a previous screen such as, for example, sensor data screen 460 of FIG. 19 or menu screen 320 of FIG. 14 or, in some cases, a home screen such as home screen 300 of FIG. 13.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. An HVAC controller for controlling one or more components of an HVAC system of a building, the HVAC controller comprising:
a user interface including a display;
a memory;
an I/O block for sending and/or receiving signals to and/or from the one or more components of the HVAC system including one or more remote sensors, wherein each of the one or more remote sensors is associated with a unique identifier that uniquely identifies the remote sensor to the HVAC controller to support communication between the HVAC controller and the one or more remote sensors;
a controller operatively coupled the user interface, the memory, and the I/O block, the controller is configured to:
display one or more screens on the display that allow a user to assign a name label to each of the one or more remote sensors; and
subsequently display the user assigned name labels on one or more screens to identify the corresponding one or more remote sensors.

2. The HVAC controller of claim 1, wherein the controller is further configured to:
display one or more screens on the display that allow a user to assign a location label to each of the one or more remote sensors; and
subsequently display the user assigned location labels on one or more screens to identify the corresponding one or more remote sensors.

3. The HVAC controller of claim 1, wherein the controller is configured to solicit the assignment of the name label from the user via the one or more screens, store the assigned name label in the memory of the HVAC controller, and subsequently display the assigned name label on one or more screens that allow the user to select which of the one or more remote sensors, if any, are to be used by the controller in providing temperature control to the building.

4. The HVAC controller of claim 3, wherein the one or more screens that allow the user to select which of the one or more remote sensors, if any, are to be used by the controller in providing temperature control to the building also allow the user to select whether an internal temperature sensor of the HVAC controller, if present, is to be used in providing temperature control to the building.

5. The HVAC controller of claim 3, wherein when two or more sensors are to be used for providing temperature control to the building, the controller uses sensor averaging.

6. The HVAC controller of claim 5, wherein the controller is configured to display one or more screens that allow the user to assign a weight for use in sensor averaging to each of the two or more sensors that are to be used for providing temperature control to the building.

7. The HVAC controller of claim 1, wherein the controller is configured to solicit the assignment of the name label from the user via the one or more screens, store the assigned name label in the memory of the HVAC controller, and subsequently display the assigned name label on one or more screens that allow the user to select which of the one or more remote sensors, if any, are to be used by the controller in providing humidification control to the building.

8. The HVAC controller of claim 1, wherein the controller is configured to solicit the assignment of the name label from the user via the one or more screens, store the assigned name label in the memory of the HVAC controller, and subsequently display the assigned name label on one or more screens that allow the user to select which of the one or more remote sensors, if any, are to be used by the controller in providing dehumidification control to the building.

9. The HVAC controller of claim 1, wherein the controller is configured to solicit the assignment of the name label from the user via the one or more screens, store the assigned name label in the memory of the HVAC controller, and subsequently display the assigned name label on one or more screens that allow the user to select which of the one or more remote sensors, if any, are to be used for viewing only.

10. An HVAC controller for controlling one or more components of an HVAC system of a building, the HVAC controller comprising:
a user interface including a display;
a memory;
an I/O block for sending and/or receiving signals to and/or from the one or more components of the HVAC system including one or more remote sensors, wherein each of the one or more remote sensors is associated with a unique identifier that uniquely identifies the remote sensor to the HVAC controller to support communication between the HVAC controller and the one or more remote sensors;

a controller operatively coupled the user interface, the memory, and the I/O block, the controller is configured to:

display one or more screens on the display that allow a user to assign a location label to each of the one or more remote sensors; and subsequently display the user assigned location labels on one or more screens to identify the corresponding one or more remote sensors.

11. The HVAC controller of claim 10, wherein the controller is configured to solicit the assignment of the location label from the user via the one or more screens, store the assigned location label in the memory of the HVAC controller, and subsequently display the assigned location label on one or more screens that allow the user to select which of the one or more remote sensors, if any, are to be used by the controller in providing temperature control to the building.

12. The HVAC controller of claim 11, wherein the one or more screens that allow the user to select which of the one or more remote sensors, if any, are to be used by the controller in providing temperature control to the building allow the user to select whether an internal temperature sensor of the HVAC controller, if present, is to be used in providing temperature control to the building.

13. The HVAC controller of claim 11, wherein when two or more sensors are to be used for providing temperature control to the building, the controller uses sensor averaging.

14. The HVAC controller of claim 13, wherein the controller is configured to display one or more screens that allow the user to assign a weight for use in sensor averaging to each of the two or more sensors that are to be used for providing temperature control to the building.

15. The HVAC controller of claim 10, wherein the controller is configured to solicit the assignment of the location label from the user via the one or more screens, store the assigned location label in the memory of the HVAC controller, and subsequently display the assigned location label on one or more screens that allow the user to select which of the one or more remote sensors, if any, are to be used by the controller in providing humidification control to the building.

16. The HVAC controller of claim 10, wherein the controller is configured to solicit the assignment of the location label from the user via the one or more screens, store the assigned location label in the memory of the HVAC controller, and subsequently display the assigned location label on one or more screens that allow the user to select which of the one or more remote sensors, if any, are to be used by the controller in providing dehumidification control to the building.

17. The HVAC controller of claim 10, wherein the controller is configured to solicit the assignment of the location label from the user via the one or more screens, store the assigned location label in the memory of the HVAC controller, and subsequently display the assigned location label on one or more screens that allow the user to select which of the one or more remote sensors, if any, are to be used for viewing only.

18. An HVAC controller configured to control one or more components of an HVAC system of a building, the HVAC controller comprising:

a user interface including a display;

a memory;

an I/O block for sending and/or receiving signals to and/or from the one or more components of the HVAC system including two or more sensors, wherein the two or more sensors comprise one or more wireless sensors;

a controller operatively coupled the user interface, the memory and the I/O block, the controller is configured to enroll one or more of the wireless sensors, allow a user to assign a label to each of the one or more wireless sensors, and store the user assigned label in the memory of the HVAC controller; and wherein the controller is configured to display a list on the display of the user interface that includes at least two sensors including at least one of the one or more wireless sensors that has a user assigned label, wherein the at least one of the one or more wireless sensors that has a user assigned label is displayed in the list using, at least in part, the corresponding user assigned label.

19. The HVAC controller of claim 18, wherein the user assigned label corresponds to a user assigned name.

20. The HVAC controller of claim 18, wherein the user assigned label corresponds to a user assigned location.

* * * * *